Jan. 18, 1949.  M. HALLEAD  2,459,641
APPARATUS FOR DRESSING THE GRINDING
WHEEL OF AN INTERNAL GRINDER
Filed June 13, 1945  16 Sheets-Sheet 1

INVENTOR.
Mervil Hallead
BY
Parker & Burton
attorneys

Jan. 18, 1949.                M. HALLEAD                 2,459,641
              APPARATUS FOR DRESSING THE GRINDING
                    WHEEL OF AN INTERNAL GRINDER
Filed June 13, 1945                              16 Sheets-Sheet 2
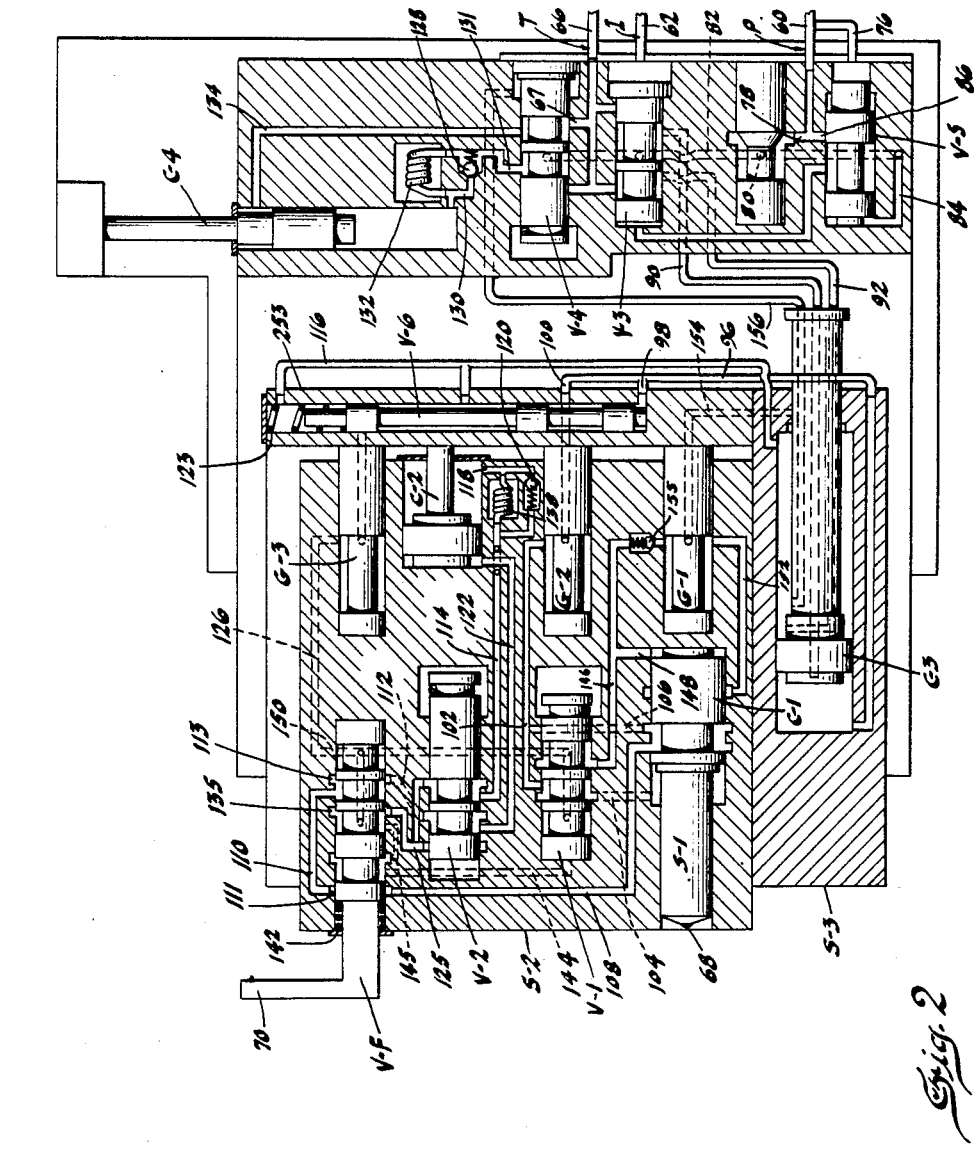
Fig. 2
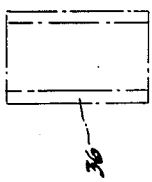
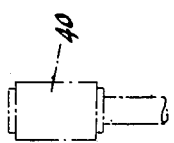
INVENTOR.
Mervil Hallead
BY
Parker & Burton
attorneys Jan. 18, 1949.    M. HALLEAD    2,459,641
APPARATUS FOR DRESSING THE GRINDING
WHEEL OF AN INTERNAL GRINDER
Filed June 13, 1945    16 Sheets-Sheet 4

INVENTOR.
Mervil Hallead
BY
Parker & Burton
attorneys

Jan. 18, 1949.                M. HALLEAD                    2,459,641
                 APPARATUS FOR DRESSING THE GRINDING
                     WHEEL OF AN INTERNAL GRINDER
Filed June 13, 1945                              16 Sheets-Sheet 5

INVENTOR.
Mervil Hallead
BY Parker & Burton
     attorneys

INVENTOR.
Mervil Hallead
BY
Parker & Burton
attorneys

Jan. 18, 1949.                  M. HALLEAD                    2,459,641
                      APPARATUS FOR DRESSING THE GRINDING
                          WHEEL OF AN INTERNAL GRINDER
Filed June 13, 1945                                    16 Sheets-Sheet 11

INVENTOR.
Mervil Hallead
BY
Parker & Burton
attorneys

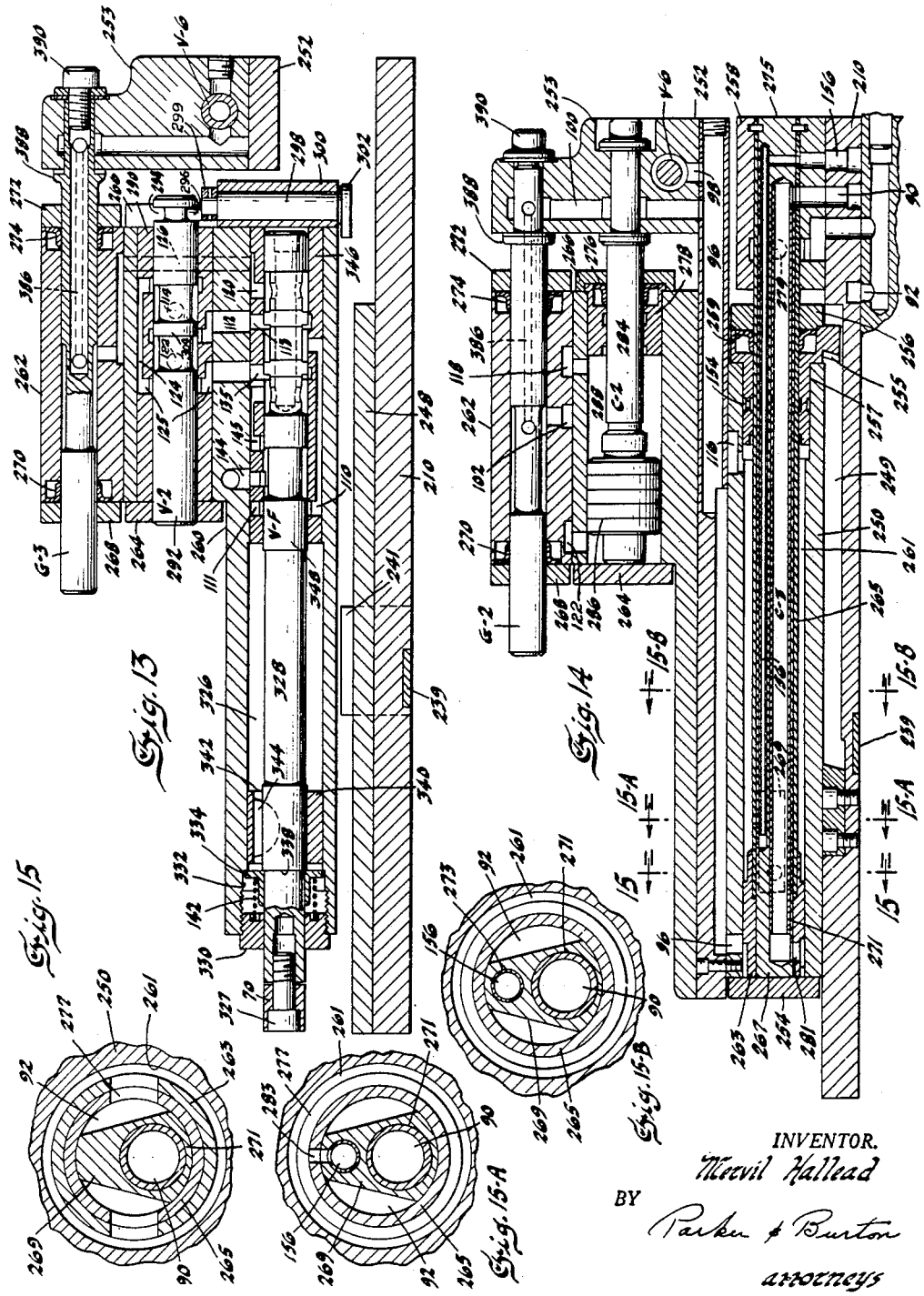

Jan. 18, 1949.  M. HALLEAD  2,459,641
APPARATUS FOR DRESSING THE GRINDING
WHEEL OF AN INTERNAL GRINDER
Filed June 13, 1945  16 Sheets-Sheet 13
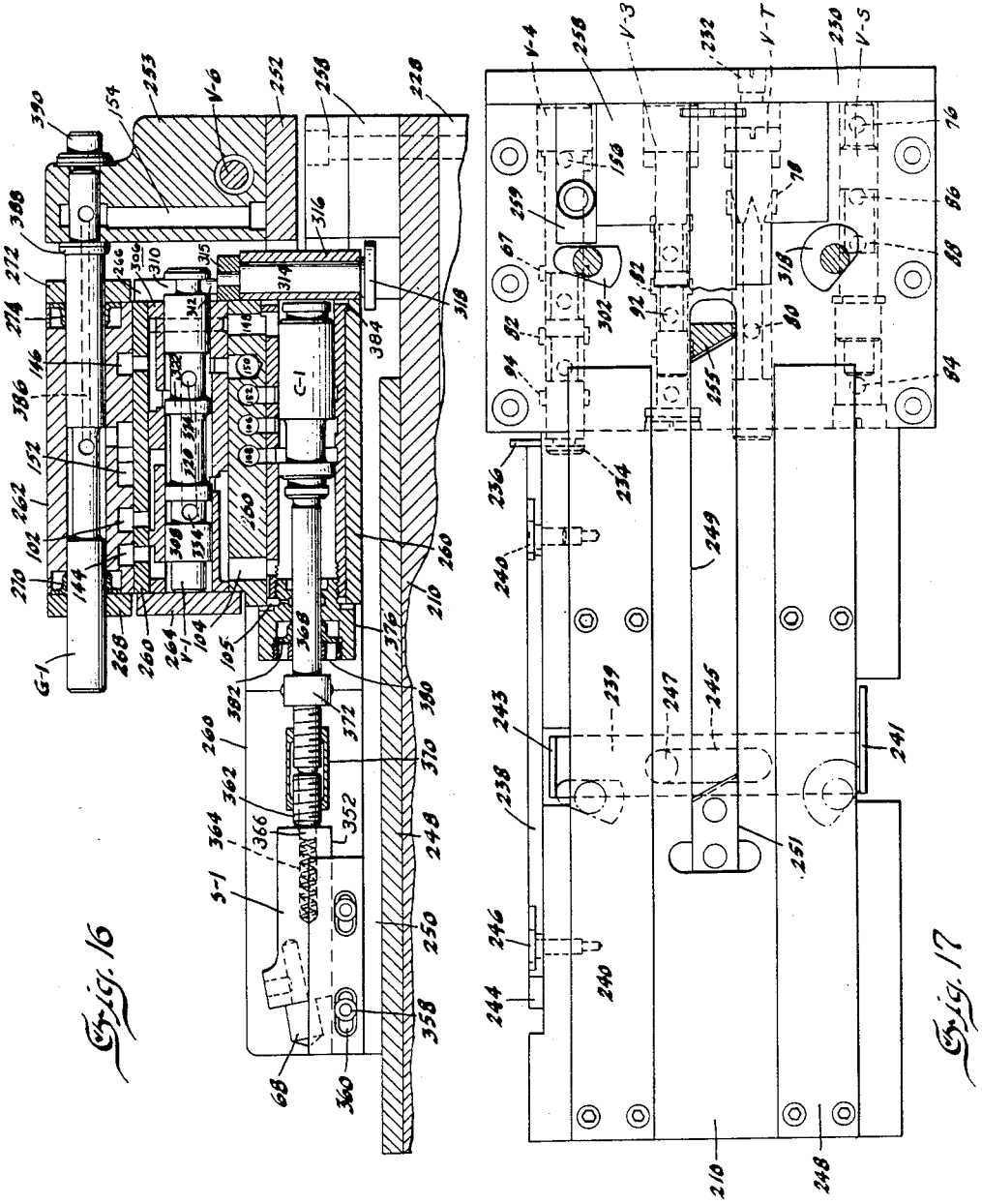
INVENTOR.
Mervil Hallead
BY
Parker & Burton
attorneys

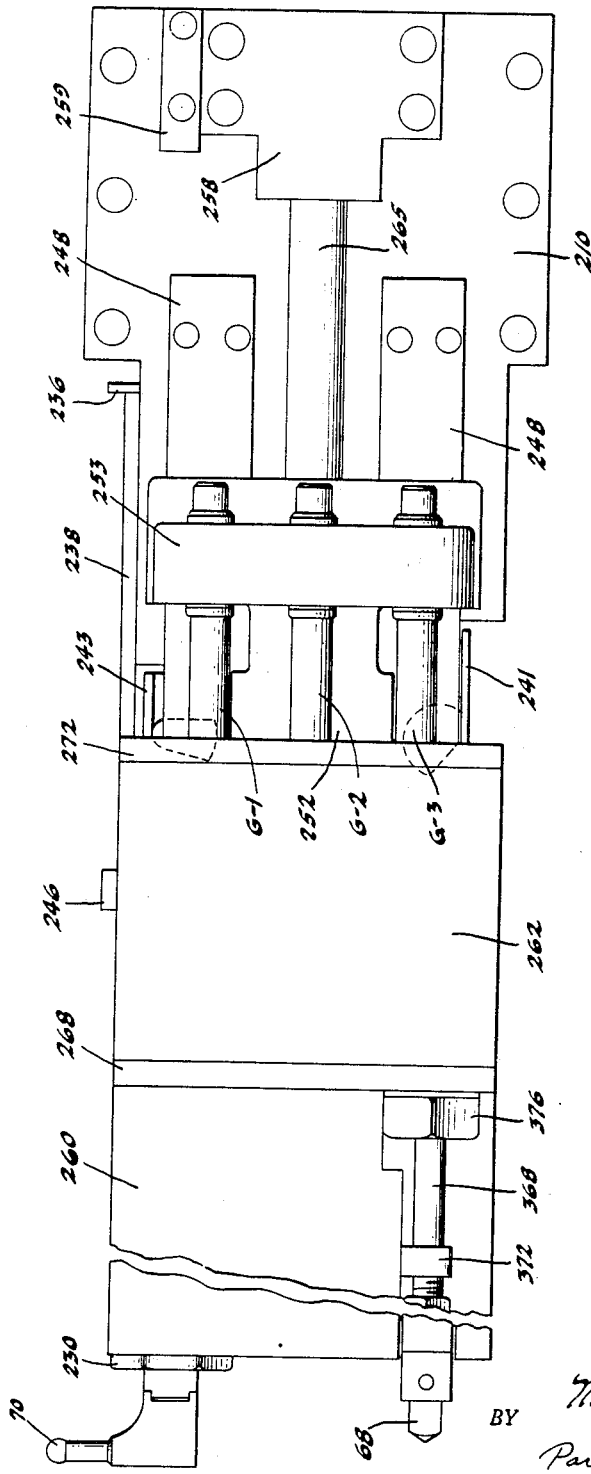

INVENTOR.
Mervil Hallead
BY Parker & Burton
attorneys

Patented Jan. 18, 1949

2,459,641

UNITED STATES PATENT OFFICE 2,459,641

APPARATUS FOR DRESSING THE GRINDING WHEEL OF AN INTERNAL GRINDER

Mervil Hallead, Detroit, Mich., assignor to Superior Machine and Engineering Company, Detroit, Mich., a corporation of Michigan Application June 13, 1945, Serial No. 599,216

25 Claims. (Cl. 125—11)

This invention relates to improvements in internal grinders and particularly to improved mechanism for dressing or truing up the grinding wheel of an internal grinder.

In the dressing or truing up of a grinding wheel of an internal grinder one practice heretofore followed has been for the machine operator, when the grinding wheel became dull or needed truing up, to manually position the diamond dresser as accurately as possible to dress the wheel and then to give the wheel a dressing operation. Such positioning of the diamond dresser by the operator required good judgment and accuracy of setting of the diamond and depended for its success upon the good judgment and workmanship of the operator. It was an operation which required time and care and it was frequently improperly carried out.

Another method heretofore practiced was to provide an internal grinder with dressing mechanism having a pre-selected number of dressing positions at which the wheel being employed in grinding the work would be dressed. The internal grinder was provided with gage mechanism which gage was normally constantly urged to enter the interior of the work and which gage did enter the work as soon as the grinding operation progressed to the stage at which entry could be effected thereby indicating, by its entry, a dressing position at which the grinding wheel should be dressed. The diamond dresser was then positioned at its pre-selected dressing position and the dressing was accomplished.

An object of this invention is to provide an internal grinder with dressing mechanism which is operable at any time at the desire of the operator, first, to gage the progress of the grinding operation to determine the desired setting of the diamond, second, to position the diamond dresser at such setting to dress or true up the grinding wheel, and third, to dress the grinding wheel.

Another object of this invention is to provide an improved mechanism for carrying out the dressing or truing up of the grinding wheel of an internal grinder rapidly, economically and accurately. The construction is such that upon the institution of a dressing cycle a gaging member automatically moves to determine the proper position at which the wheel dressing element should be set and the wheel dressing element then automatically moves and is accurately set at the proper point to perform the dressing operation.

One important object is to provide improved mechanism whereby the machine operator may at any time desired institute a dressing cycle. This dressing cycle includes the gaging of the progress of the grinding operation being carried out and the automatic setting of the wheel dressing element or diamond dresser in accordance with such gaging in order that the grinding wheel may be accurately dressed.

Another object is to provide an internal grinder with dressing mechanism including a gaging finger or follower and a diamond dresser, which dressing mechanism is so constructed that the follower may be moved, at any time desired by the machine operator, into the interior of the piece of work being ground and into contact with the ground surface thereof and the diamond dresser may be moved to a position in line with the position found by the follower to be properly located to dress the grinding wheel.

More particularly, an object is to provide an internal grinder with dressing mechanism as hereinabove described wherein, when the gaging element is brought into contact with the ground surface of the work to determine the progress of the grinding operation, the diamond dresser then automatically assumes a position as determined by the found position of the gaging element.

Specifically an object is to provide an internal grinder with hydraulically operated dresser mechanism positioned alongside the grinder which dresser mechanism is caused to be moved along a path as follows: first, along a line normal to the axis of the grinding wheel to move the follower to a point within such line; second, along a line parallel such axial line to move the follower into the interior of the work; third, along a line away from such axial line and normal thereto to bring the follower into contact with the ground surface of the work; fourth, to move the diamond dresser to a point in line with the follower when in contact with the ground surface of the work, and fifth, to withdraw the follower from the work and advance the diamond dresser along a line parallel said axial line and across the face of the grinding wheel to dress or true up the wheel.

The final position of the diamond dresser is on a line with that found by the follower when brought into contact with the ground surface of the work. The diamond dresser moves automatically upon movement of the follower and is automatically stopped on a line with the position of rest of the follower when the follower is in contact with the work.

A meritorious feature is that the several movements are hydraulically carried out and upon the institution of the hydraulic cycle successive movements take place automatically in sequence without further effort on the part of the machine operator until the diamond dresser is brought to its dressing position on a line with the position determined by the follower in its contact with the ground surface of the work and the diamond dresser is moved along such line across the face of the grinding wheel to dress the wheel.

A further meritorious feature is that the follower or gaging finger is caused to automatically follow such a path that it is brought gradually into contact with the ground surface of the work without danger of injury or disturbance either to the mechanism or to the work to determine the proper position of the diamond dresser. Furthermore, the diamond dresser moves automatically to the precise line to be traversed by the diamond in the required dressing of the grinding wheel and is advanced along such line to dress the wheel. Such functioning is automatic and independent of regulation by the machine operator and judgment or accuracy of manipulation by the operator is not a factor in carrying it out successfully.

The dressing mechanism comprises a primary slide and a secondary slide. These slides are so supported and actuated that both slides are advanced first as a unit and thereafter the secondary slide is advanced independently of the primary slide to move the follower or gaging element into contact with the work. The diamond dresser, which is carried by the secondary slide is advanced therewith during these movements. The diamond dresser includes a diamond dresser slide which is so supported upon the secondary slide as to be movable independently thereof to advance the diamond to a position in line with the follower. The primary and secondary slides are then moved to withdraw the follower from the work and to advance the diamond across the face of the grinding wheel. All of these movements automatically follow in sequence once the dressing cycle is instituted and continue to completion of the dressing cycle.

Upon institution of the dressing cycle the slides move as a unit and relatively predetermined distances to position the follower within the interior of the work. The secondary slide is then withdrawn until the follower comes into contact with the ground surface of the work. The diamond dresser slide is then automatically moved to position the diamond in line with the follower on a line parallel the axial line of the work. The slide assembly is then moved to advance the diamond across the face of the grinding wheel. The slide assembly is then withdrawn to an out of the way position to permit continuance of the grinding operation.

Other objects, advantages and meritorious features will more fully appear from the following description, appended claims and accompanying drawings wherein:

Figure 2 is a diagrammatic illustration of the dresser mechanism at the beginning of the dressing cycle, following receipt of the starting impulse, and with the valves V—S and V—3 moved hydraulically to the left from the right position at which they are shown in Figure 1 and with the lower slide S—3 started toward the left over the piston C—3.

Figure 1:
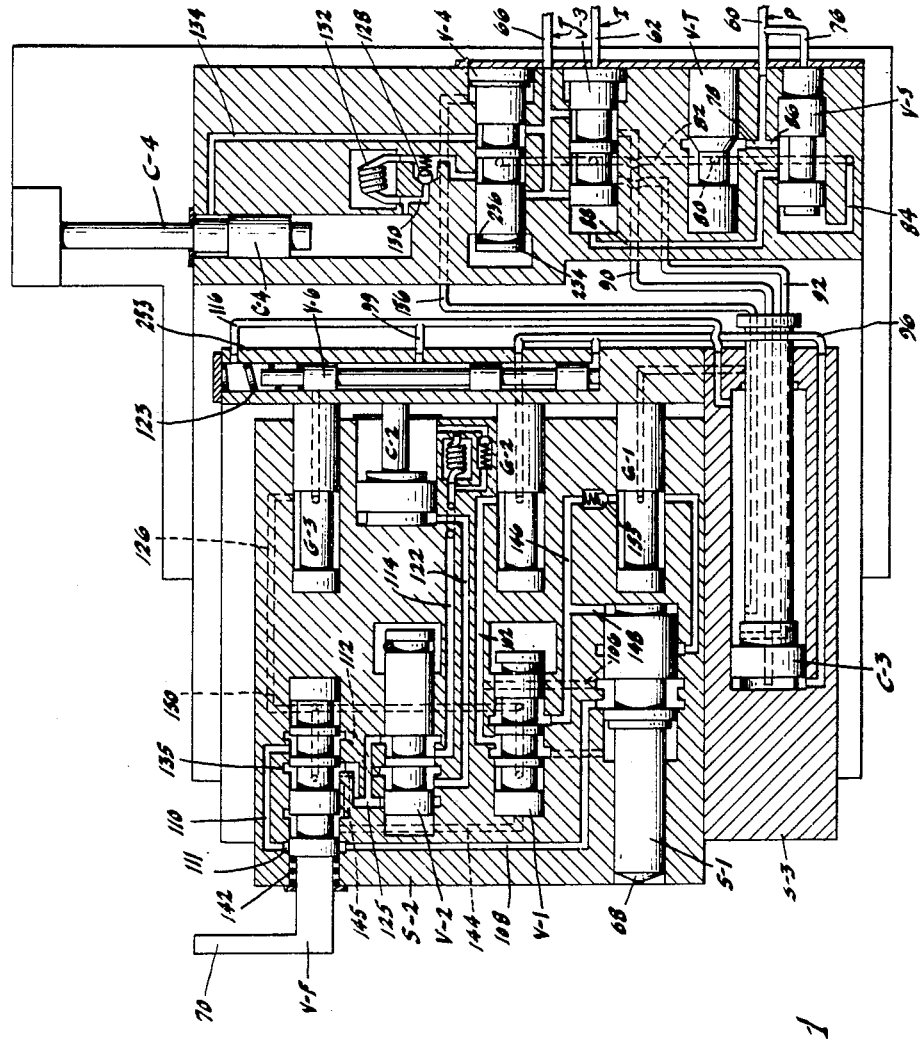
Figure 1 is a diagrammatic illustration of the dresser mechanism in the idle position. There is pressure in the hydraulic system but the dressing cycle has not yet been instituted by receipt of a starting impulse.
Figure 3:
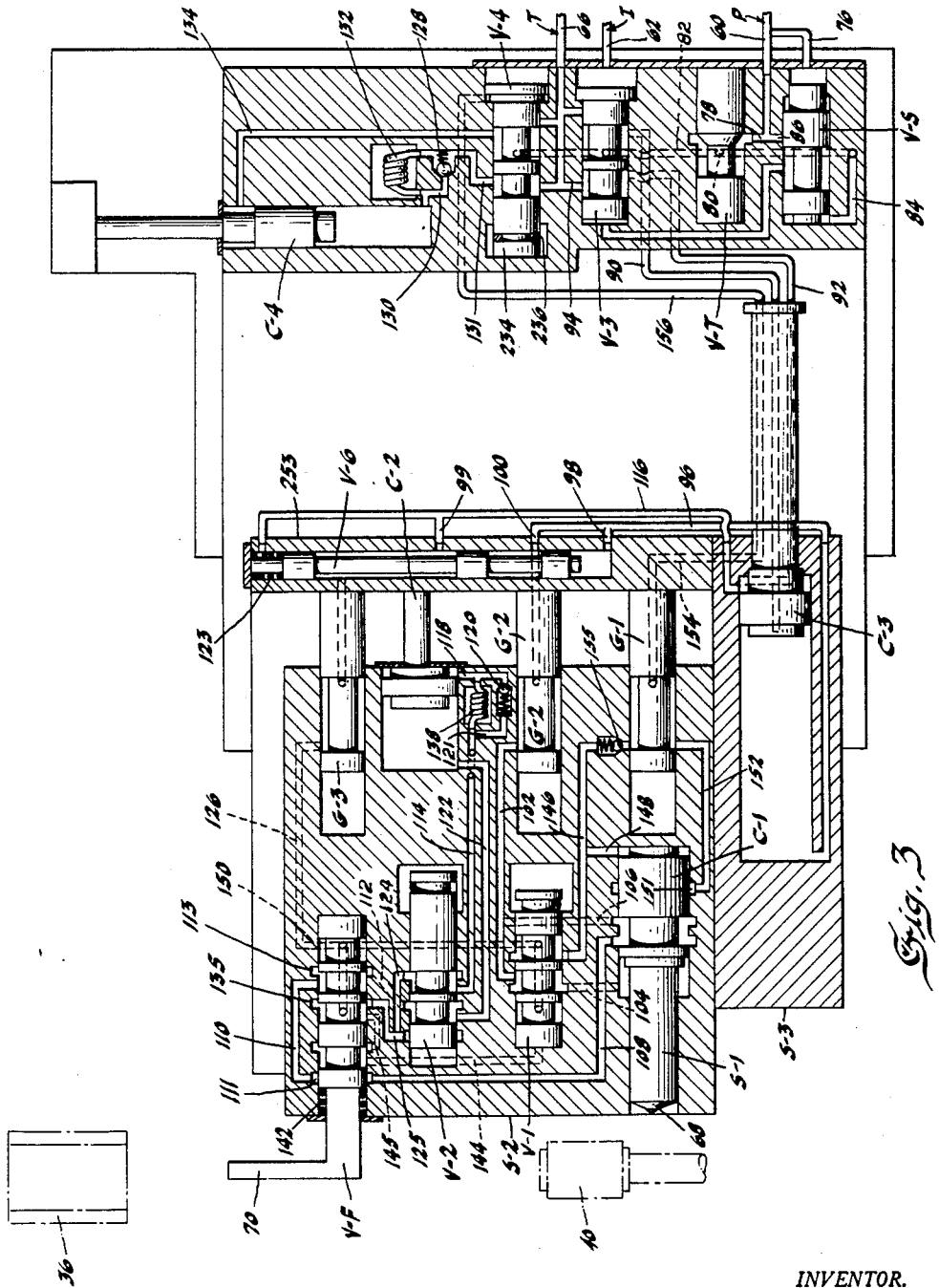

Figure 3 is a diagrammatic illustration of the dresser mechanism with the lower slide S—3 and the upper slide S—2 each completely extended to the left relative to the pistons C—3 and C—2 respectively, and showing the valve V—4 shifted mechanically to the left from the right position at which it was shown in Figures 1 and 2 and showing the valve V—6 shifted hydraulically upwardly from the down position at which it was shown in Figures 1 and 2.

Figure 4:
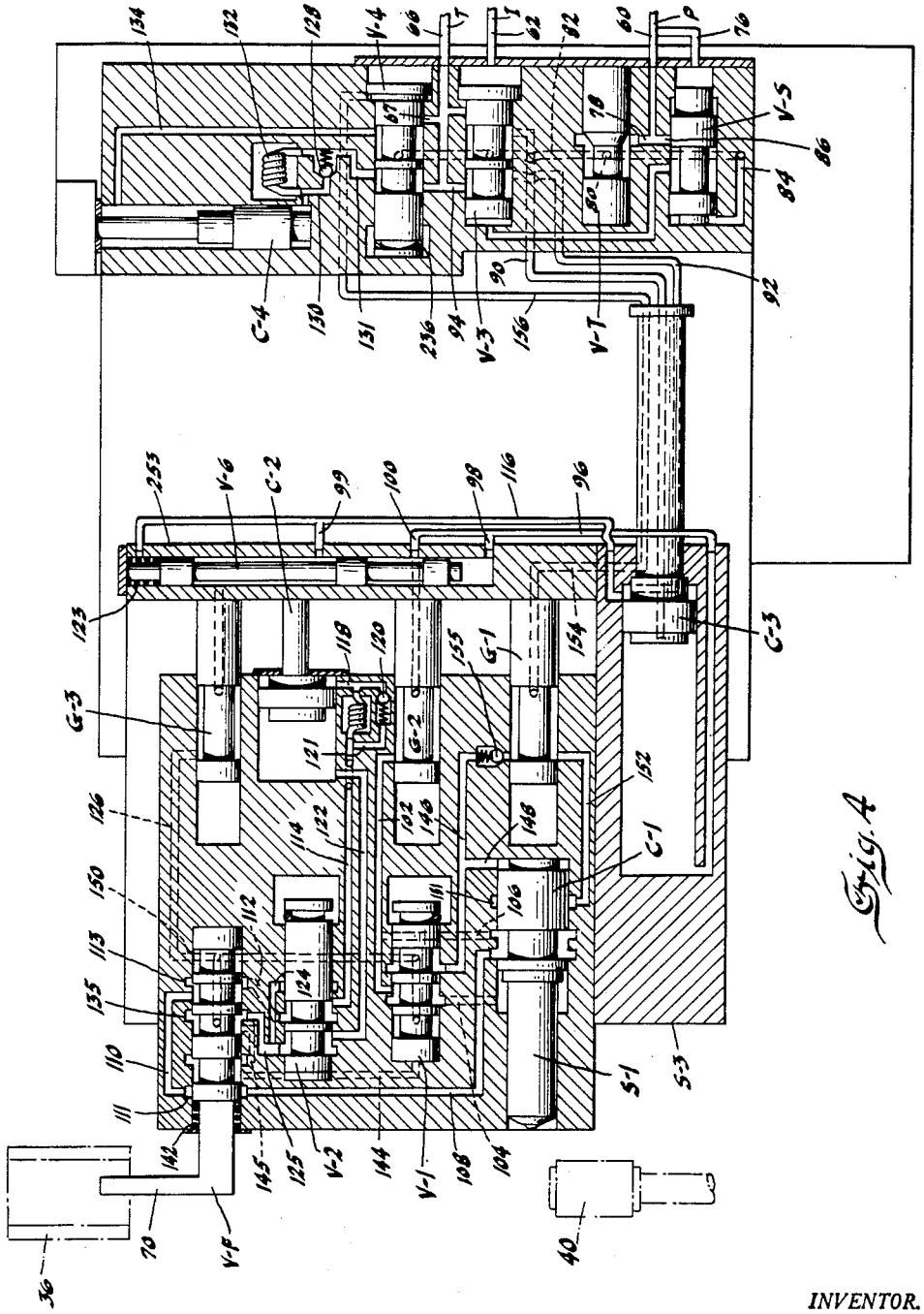

Figure 4 is a diagrammatic illustration of the dresser mechanism with the lower slide and the upper slide shown as remaining completely extended to the left as shown in Figure 3, and also showing the two slides shifted relative to piston C—4 and axially of the grinding wheel toward the work. The follower finger 10 has moved into the work and the valve V—2 has been shifted mechanically to the left from the right position at which it was shown in Figures 1, 2 and 3.

Figure 5:
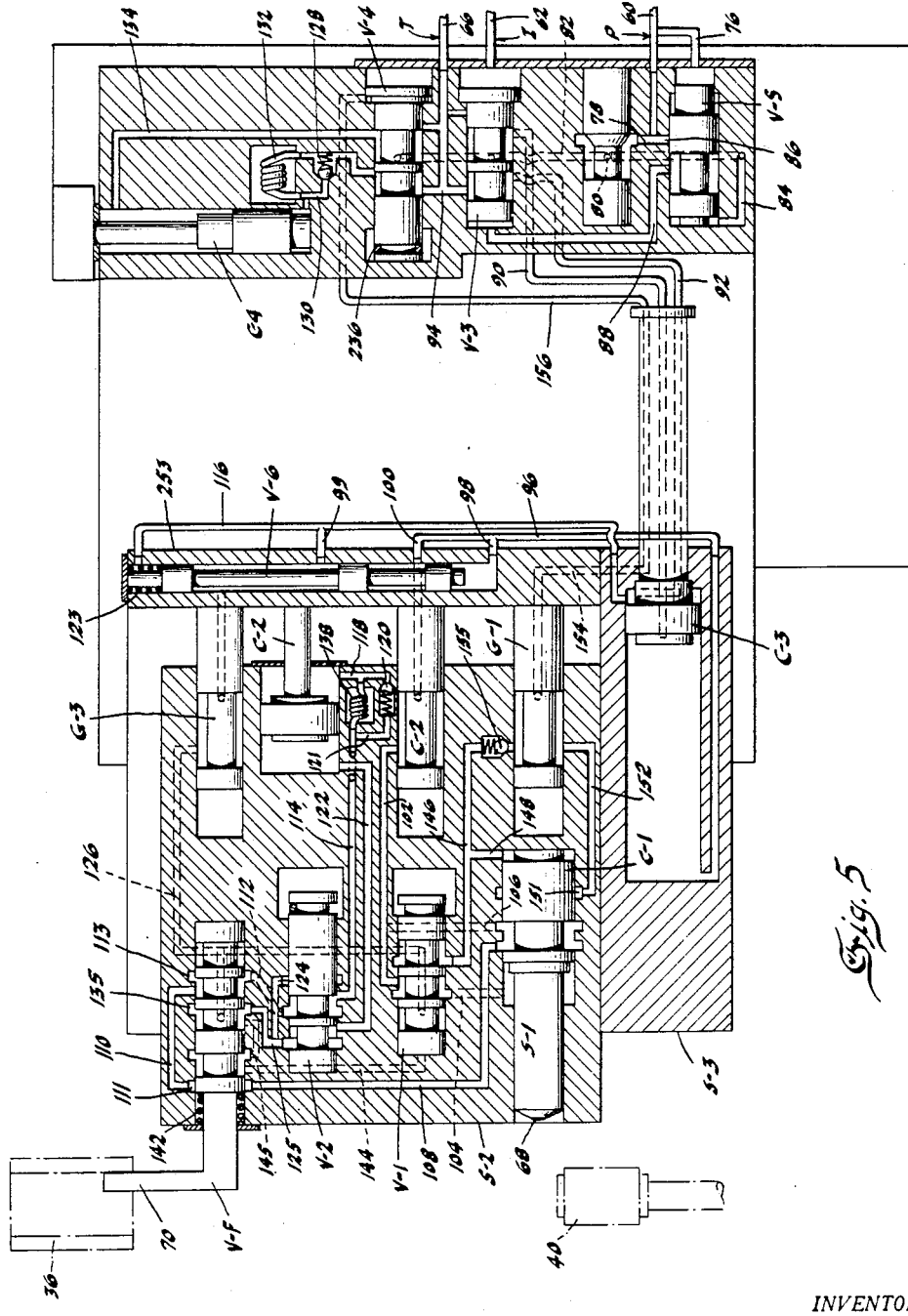
Figure 6:
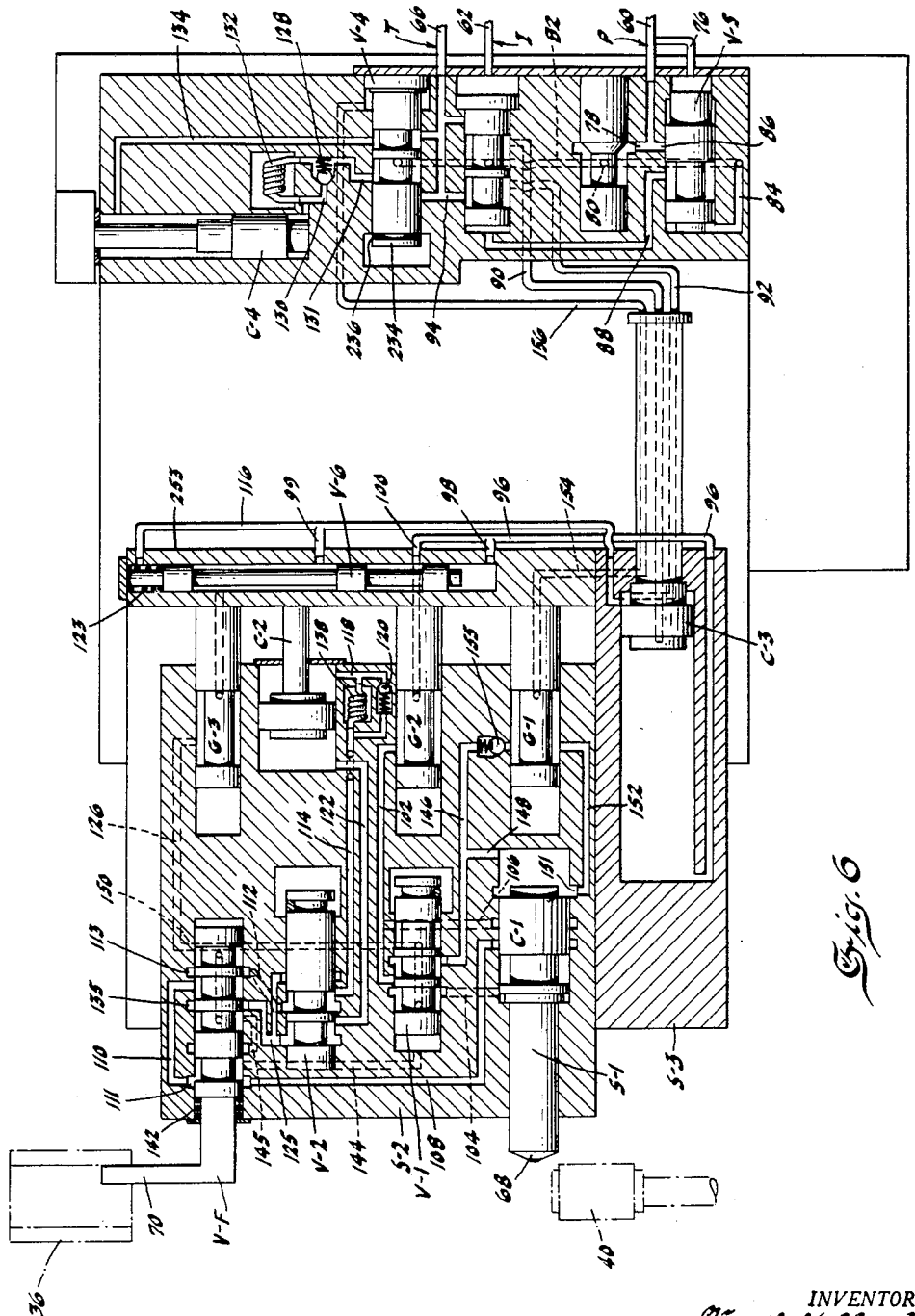

Figure 5 is a diagrammatic illustration of the dresser mechanism showing the upper slide S—2 retracted to the right from the position shown in Figure 4 sufficiently to have brought the follower finger into contact with the interior surface of the work but with the upper slide in the process of continuing its retraction to the dressing position shown in Figure 6.

Figure 6 is a diagrammatic illustration of the dresser mechanism showing the upper slide S—2 retracted to the right to the dressing position of the diamond as determined by contact of the follower finger with the work, and with the follow valve V—F shifted to the left, from the position shown in Figure 5, by contact of the follower finger with the work. The valve V—I is shown as shifted hydraulically to the right from the left position at which it was shown in Figure 5, and the diamond slide S—I is shown as extended to the left to the dressing position of the diamond, and the valve V—4 is shown as shifted hydraulically to the right from the left position at which it was shown in Figure 5.

Figure 7:
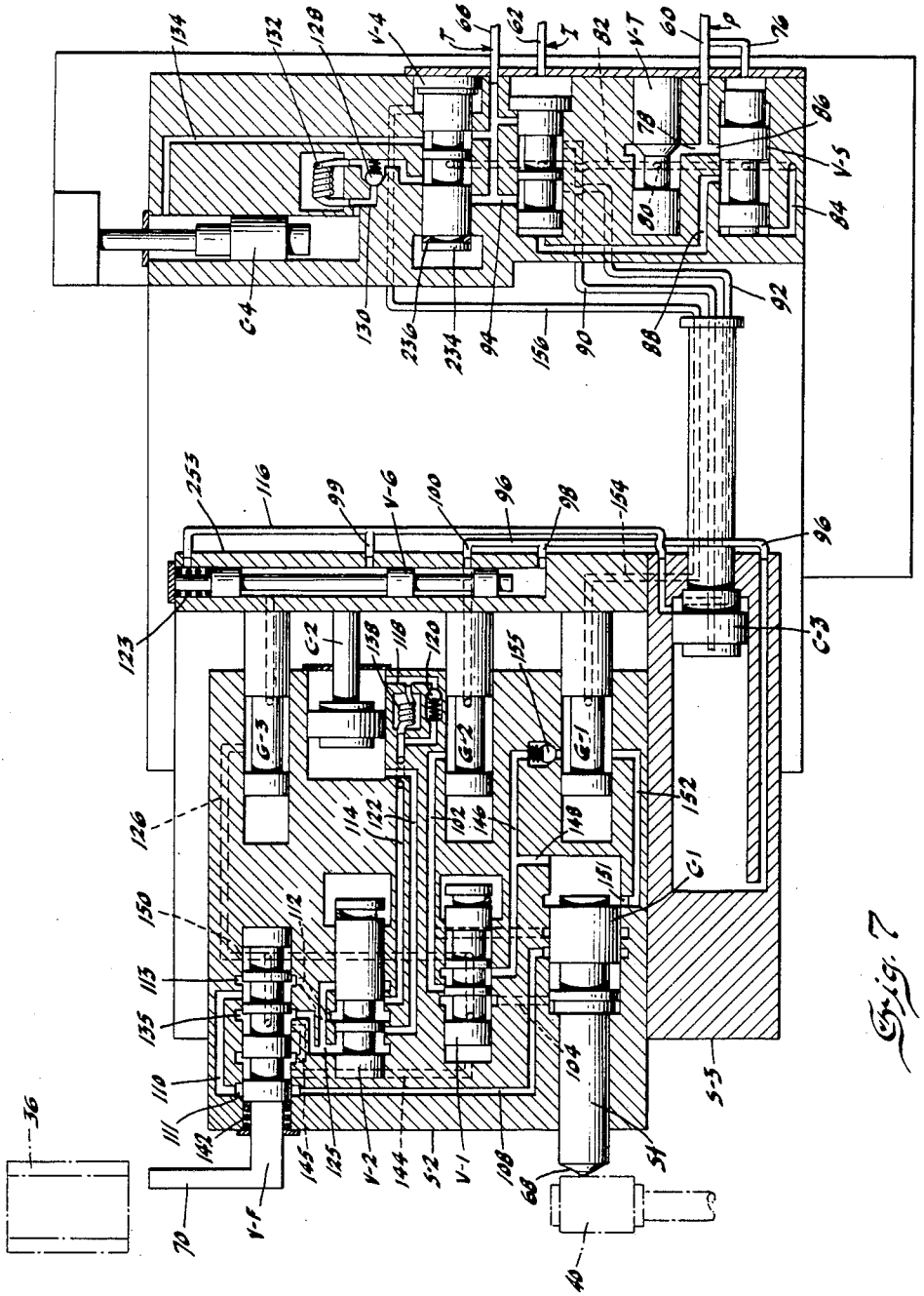

Figure 7 is a diagrammatic illustration of the dresser mechanism showing the position as the diamond is being advanced across the face of the grinding wheel during the progress of the dressing stroke. The follower finger is shown as withdrawn from the work and the follow valve has been returned by its spring to the right to the position shown in Figure 5. Both the upper slide and the lower slide are shown at an intermediate stage in their movement of withdrawal away from the work axially of the grinding wheel.

Figure 8:
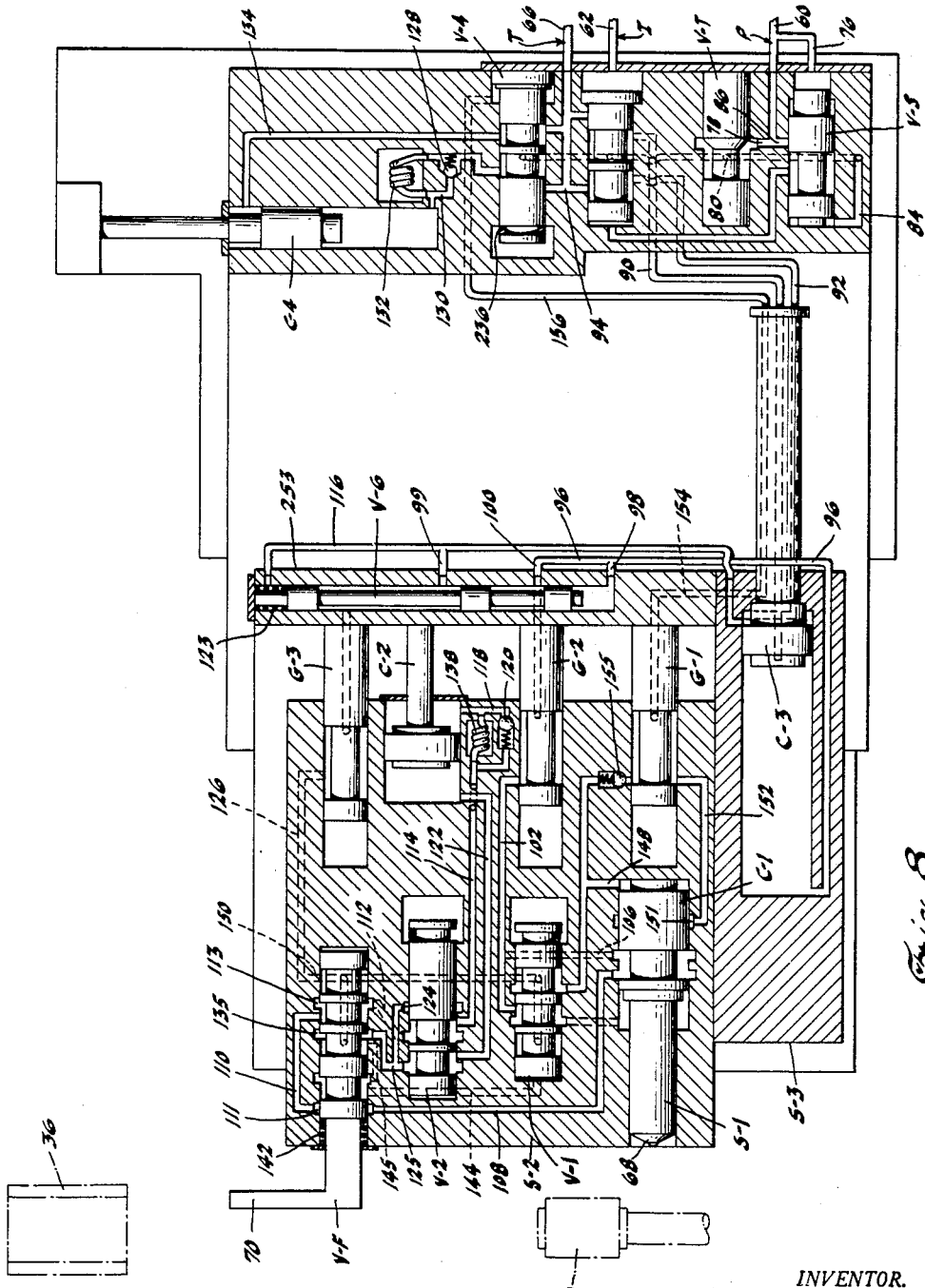

Figure 8 is a diagrammatic illustration showing the position of the dresser mechanism following the completion of the dressing stroke and showing the diamond slide S-I retracted to the right from the left position at which it was shown in Figure 7. The valve V—I is shown as shifted mechanically to the left from the right position at which it was shown in Figure 7.

Figure 9:
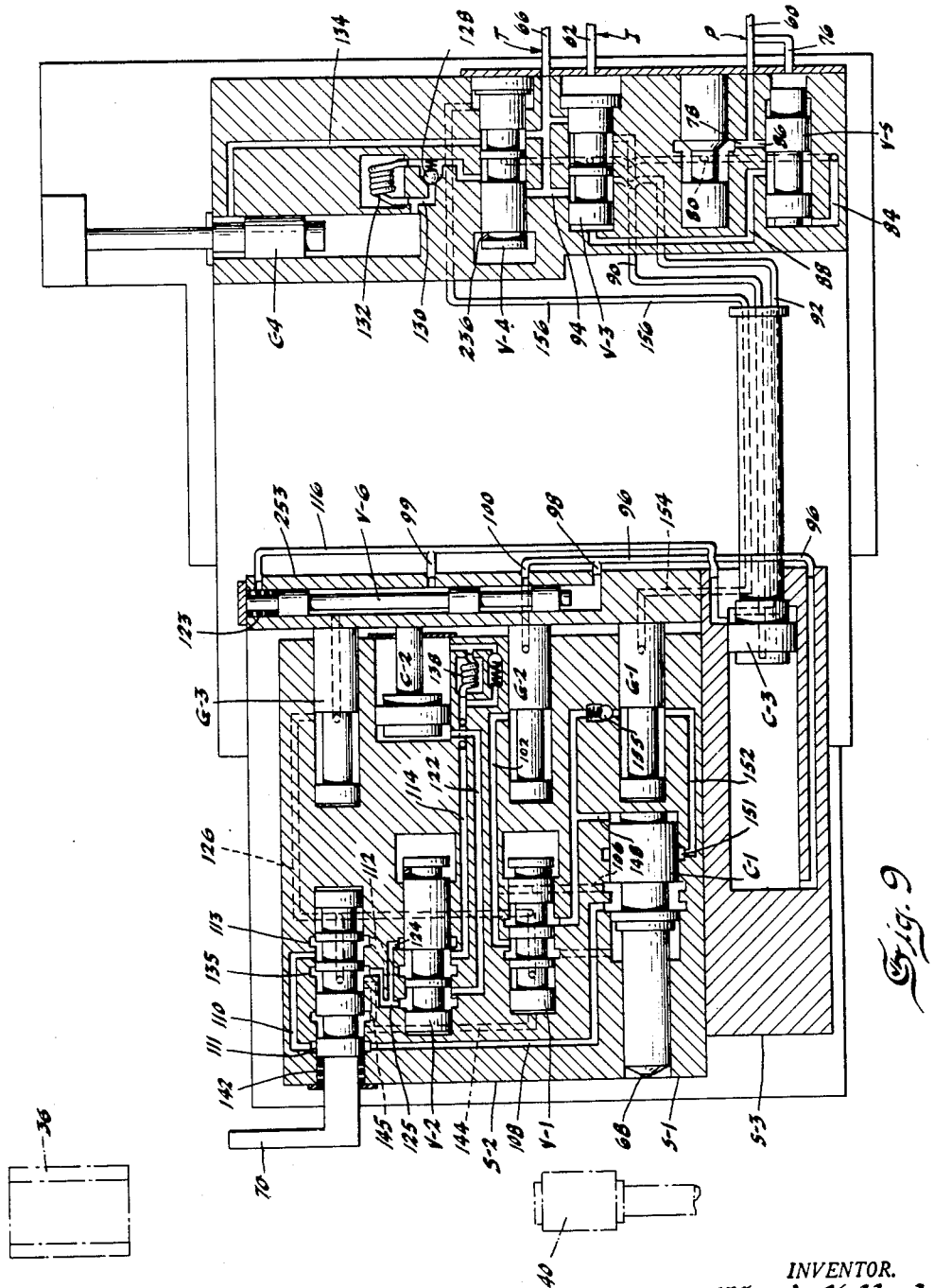

Figure 9 is a diagrammatic illustration showing the position of the dresser mechanism with the upper slide S—2 completely retracted to the right but with the lower slide S—3 still extended to the left.

Figure 10:
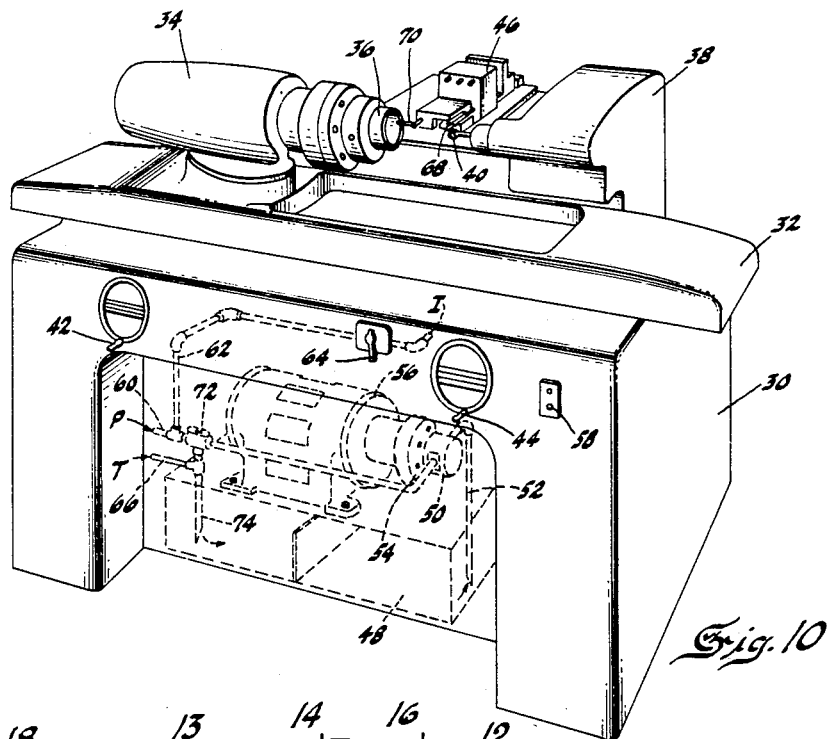

Figure 10 is a perspective of a conventional internal grinder showing the improved dresser mechanism of this application mounted thereupon.

Figure 11:
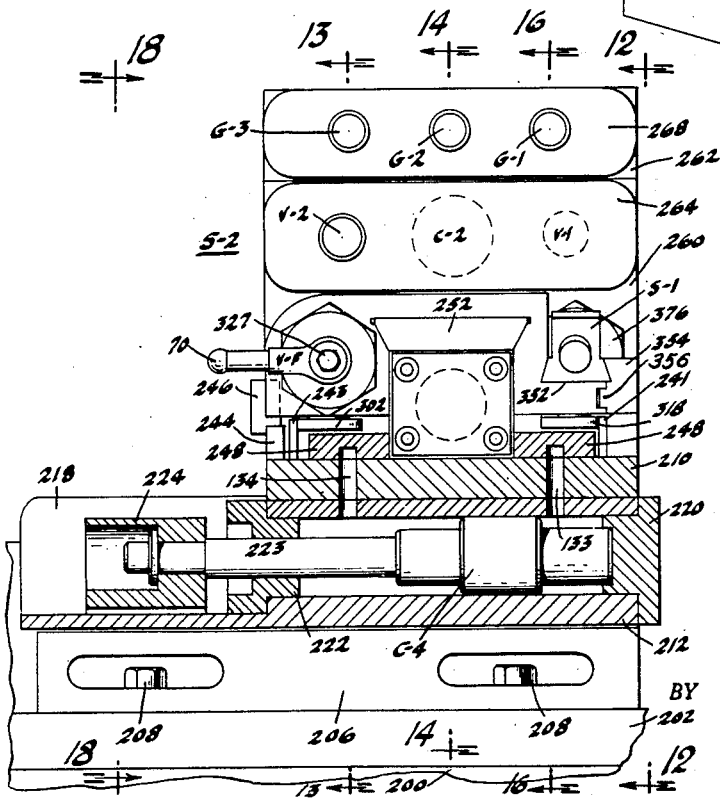
Figure 12:
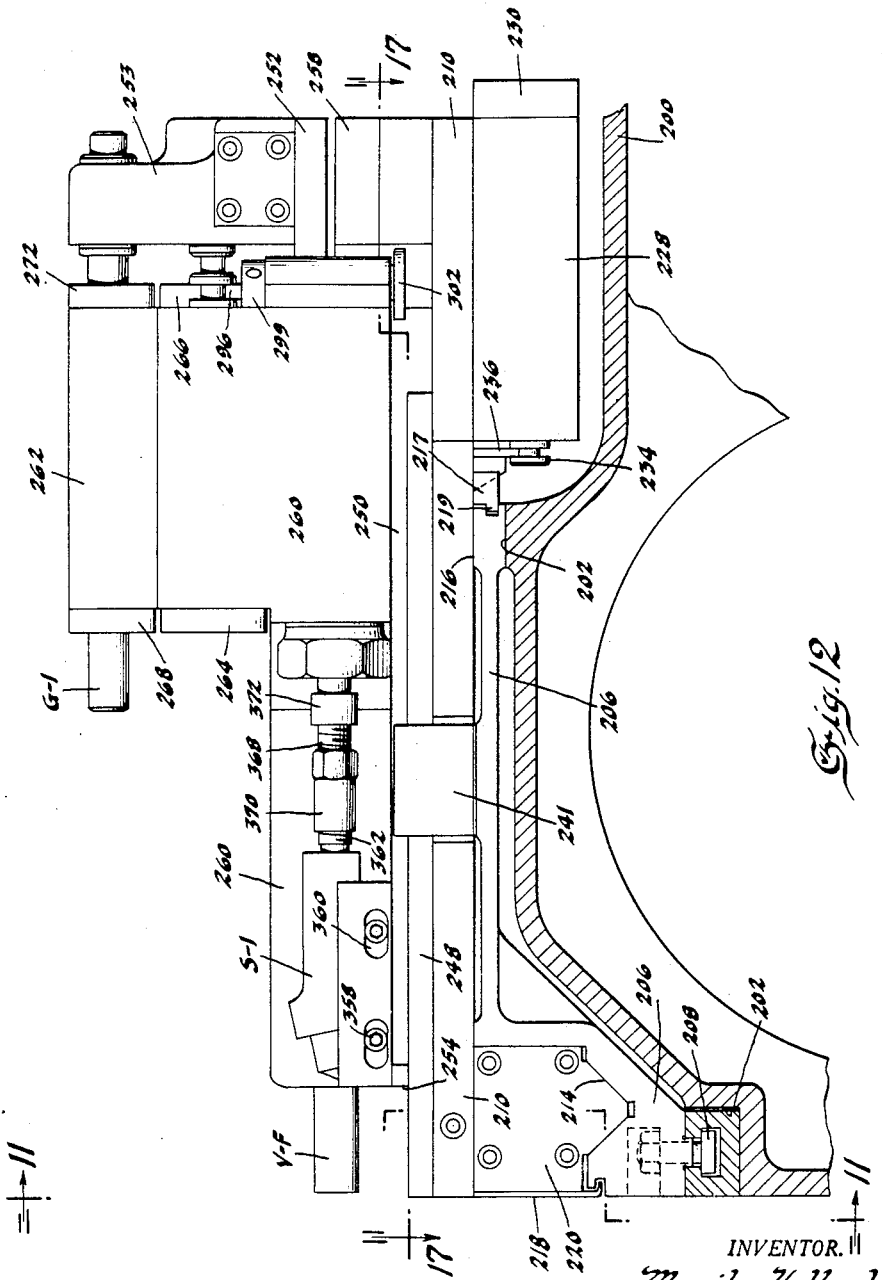

Figure 11 is a front elevation, partly in section, of the dresser taken on the line 11—11 of Figure 12.

Figure 12 is an elevation of the right side of the dresser shown in Figure 11 taken along the line 12—12 of Figure 11.

Figure 13 is a vertical cross section through the dresser taken along the line 13—13 of Figure 11.

Figure 14 is a vertical cross section through the dresser taken along the line 14—14 of Figure 11.

Figure 15 is a vertical cross section through the lower slide taken on the line 15—15 of Figure 14.

Figure 15A is a vertical cross section through the lower slide taken on the line 15A—15A of Figure 14.

Figure 15B is a vertical cross section through the lower slide taken on the line 15B—15B of Figure 14.

Figure 16 is a vertical sectional view taken on the line 16—16 of Figure 11.

Figure 17 is a horizontal sectional view taken along the line 17—17 of Figure 12, showing the bed plate and associated structure in plan.

Figure 18:
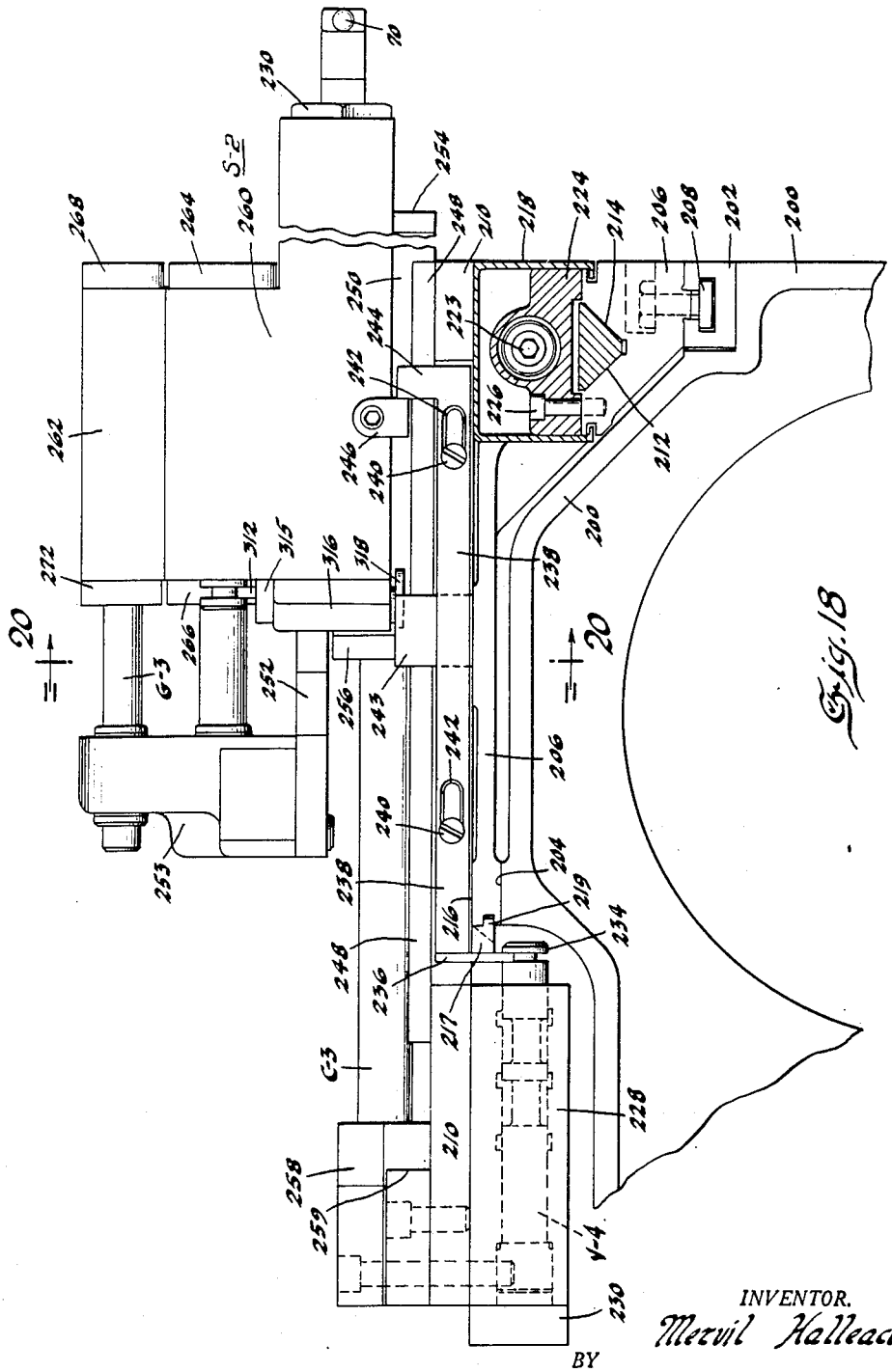

Figure 18 is an elevation, partly in section, of the left side of the dresser shown in Figure 11 taken along the line 18—18 but showing both the upper and lower slides fully extended as compared with the retracted positions at which the slides are shown in Figure 12.

Figure 19 is a plan of the dresser showing the upper slide and the lower slide in the fully extended position as in Figure 18.

Figure 20:
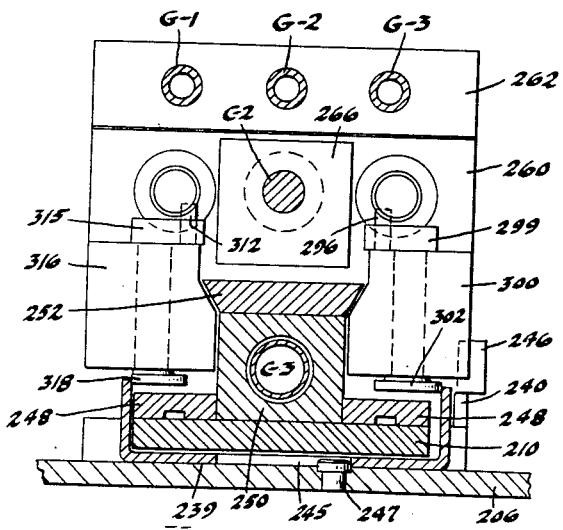

Figure 20 is a vertical section taken on line 20—20 of Figure 18.

Figure 21:
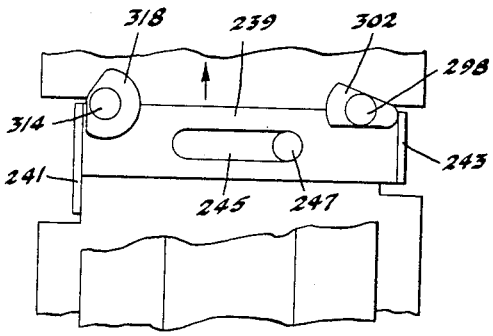

Figure 21 is a diagrammatic view of the mechanical valve operating cams when the dresser occupies the position shown in Figure 3.

Figure 22:
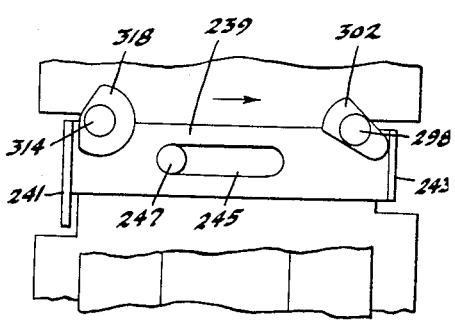

Figure 22 is a diagrammatic view of the mechanical valve operating cams when the dresser occupies the position shown in Figure 4.

Figure 23:
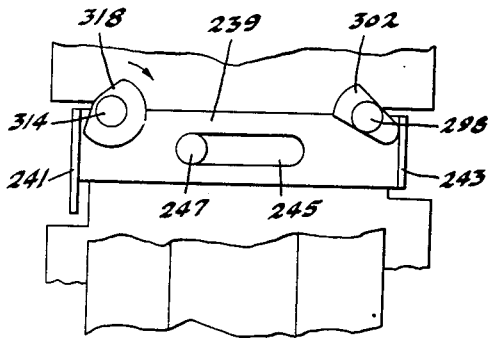

Figure 23 is a diagrammatic view of the mechanical valve operating cams when the dresser occupies the position shown in Figure 6.

Figure 24:
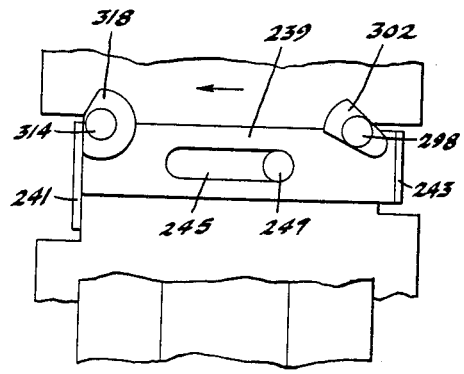

Figure 24 is a diagrammatic view of the mechanical valve operating cams when the dresser occupies the position shown in Figure 8.

In the accompanying drawing, Figures 1 through 9 illustrate successive stages in the process embodying the complete dressing cycle. These figures also illustrate diagrammatically the hydraulic circuit mechanism whereby the dressing operation is accomplished. Figure 10 illustrates a conventional internal grinder. It is believed that the invention can be more readily understood by first considering these Figures 1 through 9, with preliminary reference to Figure 10.

In Figure 10 an internal grinder is shown including a machine frame 30 supporting a work table 32, which table 32 carries an angularly adjustable rotatable work head 34, which head is adapted to receive, support and revolve a piece of work 36 in the usual manner. The piece of work is shown as having a cylindrical bore adapted to be ground by a grinding wheel. A grinding wheel head 38 is provided which head overhangs the table and supports for revolution a grinding wheel 40. This grinding wheel head 38 is supported in a conventional manner for movement along a line normal to the axis of the wheel to carry out the grinding operation. This work head is also conventionally adjustable parallel to the axis of the grinding wheel to accommodate pieces of work of different dimensions and grinding wheel quills of different lengths. The grinding wheel is adapted to be received within the work 36 and to revolve therein and during the revolution of the work to grind the piece of work internally. The work table 32 is supported in a conventional manner for reciprocation axially of the grinding wheel.

As desired the machine operator may reciprocate the table and the work head manually by a hand wheel 42 and the grinding wheel head may be reciprocated manually by a hand wheel 44. This structure is conventional and the manual operations described may be carried out by power means without varying in any way the invention hereinafter set forth. The dresser mechanism assembly is illustrated in Figure 10 at 46.

This dresser mechanism is mounted alongside the internal grinder and is supported thereupon in any suitable manner. Preferably the dresser mechanism is supported upon the grinding wheel head structure for concurrent adjustable positioning therewith. The dresser mechanism is adapted to be operated to project a gaging element 70 into the piece of work 36 being ground to determine the position to which the grinding operation has progressed. Upon the determination of this position the dresser mechanism functions to project a diamond or wheel dressing element 68 automatically to the proper position, as found by the gaging element, to dress the grinding wheel 40 and also functions to advance the diamond across the face of the wheel. It is a purpose of this invention to provide dresser mechanism which, upon institution of a dressing cycle, proceeds automatically to determine the proper setting for the diamond, to set the diamond at such position, to advance the diamond across the face of the grinding wheel and to then withdraw the diamond away from the grinding wheel, thereby completing the cycle.

There is illustrated diagrammatically in Figure 10 liquid pressure developing mechanism including a liquid carrying tank 48, a pump 50 having an intake line 52 leading into the tank and a pressure outlet line 54 leading from the pump. The pump may be driven by an electric motor 56 and a switch 58 is provided to control the functioning of the motor. The outlet 54 from the pump has a branch 60, denominated a pressure line, marked with a capital P, and a branch 62 denominated an impulse line marked with a capital I. A manual control valve 64 is located in the impulse line. A line 66 leads from the hydraulic circuit of the dresser back into the tank through a discharge outlet pipe 74, discharging liquid from the dresser hydraulic circuit back into the tank and this line is denominated a tank line indicated by a capital T. These same lines, pressure, impulse and tank appear in the hydraulic diagrams, Figures 1 through 9.

Considering now the Figures 1 through 9; in each figure the hydraulic circuit is illustrated in connection with functioning hydraulic mechanism and with the grinding wheel 40 of the internal grinder and the hollow cylindrical piece of work 36 supported by the work head of the grinder shown diagrammatically in positions they would occupy with respect to the gaging element or follower 70 of the dresser and the diamond dresser or wheel dressing element 68 which are shown in plan.

Figure 1 illustrates the mechanism in the normal idle position wherein the system is filled with liquid and the pump is operating maintaining a pressure in the pressure line and placing certain parts of the hydraulic mechanism under pressure to maintain the mechanism as shown in Figure 1. In this figure pressure is maintained in the pressure line 60 and in the subsidiary lines in the dresser communicating therewith as shown in such figures, such as lines 76, 78, 82, 84, 86, 88, 92, 131, 132 and in chambers V—S, V—T, V—3, V—4, C—4, C—3 and V—6, maintaining the valves and parts in the positions shown in such figure during the time the pump is operating but prior to the institution of a dressing cycle. The follower 70 and the diamond dresser 68 are both held withdrawn away from the work and from the grinding wheel and at the positions to which they were moved as shown in Figure 9 and the internal grinding operation of the machine can proceed without interference from the dresser.

A predetermined pressure is maintained within the system upon certain selected parts as hereinafter referred to and this predetermined pressure may be regulated so as to permit continuing operation of the pump, by a relief valve 72 shown in Figure 10, which relief valve may be set to release liquid, upon a predetermined pressure build up in the system, to recirculate through the outlet 74 back into the tank 48 with the desired pressure being maintained within the system.

There is pressure from the pressure line 60 directly into the right end of the chamber of sequence valve V—S through lead 76 and indirectly into the left end of sequence valve chamber V—S through a lead 78 and through the valve chamber V—T and port 80 therefrom into lead 82 and through lead 82 and lead 84 into the left end of the sequence valve chamber V—S. The lead 78 is into the chamber of a manually controlled throttle valve V—T which throttle valve may be manually set as desired to regulate delivery of liquid through the outlet from lead 78 into the system. Valve V—T is shown in Figure 17 as having a head which is threaded and provided with a kerf in the end to receive a screw driver upon removal of a plug in the outer plate of the valve block permitting threaded adjustment of the valve to regulate liquid delivery. Valve V—S is held to the right at this time as shown in Figure 1 because the left end of the valve is larger in cross section than the right end thereof.

There is pressure also in the left end of chamber V—3 from pressure line 60 through lead 86 through sequence valve chamber V—S and lead 88 therefrom to the left end of valve chamber V—3, holding valve V—3 to the right. Valve V—3 is held to the right until an impulse is received on the right end thereof, as hereinafter described.

This impulse is given when desired by the machine operator by actuation of the valve 64 (Figure 10). Operation of this valve 64 which opens the impulse line 62 to hydraulic pressure creates a surge or impulse therein. This oil pressure impulse is received directly on the right end of V—3 and moves V—3 to the left and institutes the dressing cycle. The impulse lasts part way through the dressing cycle. The piston V—3 is shown at the right in Figure 1 as it would be disposed before the receipt of the impulse. When the impulse described reaches the right end of V—3 this piston moves from the right to the left as shown in Figure 2. V—3, at all times the pump is operating and the valve 64 in the impulse line is open, has equal unit pressure on both ends, but since the right end is larger than the left, V—3 moves in response to the impulse and remains left.

When V—3 moves left by the pressure on its right end it exhausts and forces the liquid at its left end back into the system through lead 88, sequence valve chamber V—S, lead 86 therefrom and into the pressure line 60. At this time sequence valve V—S is at the right as shown in Figure 1.

As the valve V—3 moves left it places the line 90 in communication with lead 82 through chamber V—3 and blocks communication between lead 82 and 92 through such chamber V—3, all as shown in Figure 2 as compared with the showing in Figure 1. Lead 90 extends from chamber V—3 to the left end of the piston and cylinder assembly C—3, which operates the lower slide of the dresser assembly. Since the piston in this assembly C—3 is stationary the lower slide S—3 begins to move out as shown in Figure 2 when liquid pressure builds up at the left end of C—3. Liquid pressure is from the pressure line 60, through lead 78, throttle valve chamber V—T, port 80, branch of lead 82 leading to chamber V—3, line 90 and piston C—3 into the left end of chamber C—3.

C—3 exhausts from the chamber at the right end of the piston head through the lowermost dotted line outlet lead 92 into chamber V—3, and through branch lead 94 into the tank line 66 and back into the tank. This occurs while the lower slide S—3 is being moved outwardly. Actually from descriptive matter hereinafter appearing the mechanical construction of piston C—3 is not precisely as diagrammatically illustrated in these hydraulic diagrams Figures 1 through 9 but the operation is as here described.

The dresser assembly comprises a lower slide S—3 and an upper slide S—2 (Figures 1 through 9). These two slides are mechanically coupled together as hereinafter described and move out in unison a predetermined distance toward the axial line of the grinding wheel under the impulse of the liquid pressure in cylinder C—3. When the lower slide S—3 arrives at the limit of its outward movement, the beginning of which movement is shown in Figure 2 and the completion of which movement is shown in Figure 3, the upper slide S—2 is hydraulically actuated to continue independently in the same direction, through functioning hereinafter described, to the position also shown in Figure 3. If desired, as is hereinafter brought out, instead of the upper slide in its independent movement following the movement of the lower slide, the upper slide may be moved outwardly relative to the lower slide at the same time that both slides are being moved out through movement of the lower slide.

Generally speaking the movement of the dresser assembly in determining the proper position of the diamond, and then in carrying out the dressing operation is as follows: After the grinding wheel has been withdrawn from the work and the dresser mechanism, first both slides together and preferably thereafter the upper slide independently of and over the lower slide, is moved out radially of the grinding wheel to position the follower upon the projection of the axial line of the work; then the dresser mechanism is moved parallel to such axial line until the follower is disposed within the interior of the work; the upper slide of the dresser is then withdrawn over the lower slide and radially of the work until the follower contacts the ground surface of the work; the diamond dresser element is then projected radially of the work into alignment with the follower; the dresser is then withdrawn parallel to the axis of the work, withdrawing the follower from the work and passing the diamond across the face of the grinding wheel; thereafter the dresser is withdrawn radially to the starting position withdrawing the diamond and the follower out of the way to the positions shown in Figure 1. Upon the inception of the dressing cycle by the machine operator the above sequence of movements follow one another automatically and continuously as hereinafter described.

At the same time that the lower slide is moving out the oil pressure continues out of the left end of C—3 through lead 96 and through one branch 98 into the lower end of chamber V—6 below the lowermost piston head of piston V—6, and through another branch 100 from lead 96 the pressure continues through trombone gland and chamber G—2 and lead 102, through valve chamber V—1, and out through lead 104 into the left end of the diamond slide cylinder C—1 where it is blocked but where it maintains the diamond slide S—1 withdrawn to the right, all as shown in Figure 2.

Another branch 106 of this same line 102 from G—2 bypasses V—1 and enters chamber C—1 midway between its ends and from chamber C—1 pressure passes through lead 108 and through an encircling passage 111 around the left end of the follow valve V—F and by way of lead 110 into and through an intermediate portion of the follow valve chamber V—F, through lead 112 into valve chamber V—2, and out of V—2 through lead 122 to the left end of chamber C—2 to move the upper slide outwardly or to the left. Since the piston C—2 is stationary the upper slide moves left over the lower slide relatively to the piston C—2 to the position shown in Figure 3.

The upper slide carries the follower 70 and diamond 68 from the position shown in Figure 2 to that shown in Figure 3. This completes the movement of the dresser radially outwards toward the axial line of the grinding wheel. The extent of these movements is predetermined to bring the follower to a predetermined position with respect to the axial line of the work or grinding wheel. The lower slide may be permitted the greater movement. It may have a movement of 7¼ inches as compared with permitted independent movement of 1½ inches of the upper slide. The actual distances moved with respect to the axis of the grinding wheel will of course depend upon the design of the dresser and the internal grinder.

The construction is preferably such that the upper slide cannot move left until the lower slide has completed its outward movement. This is because the exhaust from chamber C—2, which C—2 controls the movement of the upper slide, is blocked at V—6 by the upper piston head of valve V—6, as shown in Figures 1 and 2, until valve V—6 is lifted. There is a spring 123 which spring is normally of sufficient strength to hold the valve piston V—6 at the position shown in Figures 1 and 2 until the lower slide has completed its outward movement. When the lower slide has completed its outward movement the pressure builds up sufficiently to overcome the spring 123 and move the valve V—6 upwardly against the spring from the position shown in Figure 2 to the position shown in Figure 3. Obviously, if it was so desired, the strength of the spring might be so arranged that the valve V—6 would move to the position shown in Figure 3 during the time the lower slide was moving outwardly. In the preferred form however the spring does not yield until the lower slide has completed its outward movement and the pressure has built up.

When the piston V—6 is lifted the exhaust from C—2, which had been blocked by the upper piston head of valve V—6 from gland G—3 as shown in Figures 1 and 2, is opened, and liquid can exhaust from the right end of C—2 to the tank and the upper slide can move out. C—2 exhausts from the right end through lead 118 by lifting a ball check 120 against a light spring and flows through leads 121 and 114 into and through chamber V—2, through leads 124 and 125 and through V—F (chamber and valve), through lead 126, through gland chamber and piston G—3, chamber V—6, lead 116, chamber C—3, lead 92, into and through V—3 and lead 94 into tank line 66.

As soon as the movement in the dresser started, following receipt of the impulse, the sequence valve V—S moves left from the position shown in Figure 1 to that shown in Figure 2. As heretofore set forth in the description of Figure 1, there is equal pressure on both ends of sequence valve V—S prior to the receipt of an impulse but valve V—S is held to the right because the left end of the valve is larger. So long as valve V—S is held to the right, liquid pressure is maintained on the left end of valve V—3 and this valve is held to the right as shown in Figure 1. The pressure on the right end of V—S is directly from the outside pressure lead 60 through branch 76, whereas the pressure on the left end comes from inside the dresser, through the throttle valve V—T, therefore so long as the dresser is standing still, valve V—S will be held to the right. However when the oil in the dresser starts moving, pursuant to a received impulse which impulse also moves valve V—3 to the left, this flow of oil will cause the pressure inside the dresser to drop in accordance with Bernoulli's theorem. As this pressure inside the dresser must go through the throttle valve V—T, which restricts the area of the oil passage inside the dresser as compared with the area of the outside leads, the pressure from the outside leads overcomes the lessened pressure on the left end of valve V—S and the handicap of the right end of V—S being slightly smaller than the left, and moves V—S to the left as shown in Figure 2.

As valve V—S moves left the right end head cuts off the pressure from pressure line 60 through 86 to chamber V—S and to the left end of V—3, as shown in Figure 2, and allows V—3 to remain (after the effect of the received impulse has passed) in the left position during the continuance of the dressing operation. The only purpose of V—S moving left is to cut off pressure from the left end of V—3 to permit V—3 to remain left during dressing following the passing of the effect of the received impulse. When V—S moves left it forces the oil at its left end back into the system through leads 84 and 82, chamber V—T, lead 78 and back into the pressure line 60.

Figure 1 shows the hydraulic system of the dresser before the impulse is received. Figure 2 shows such hydraulic system following the receipt of the impulse with V—S and V—3 left and the lower slide started out. In Figure 2, V—6 is shown down preventing exhaust from the left end of C—2 and restraining movement of the upper slide until the lower slide has completed its outward movement. Figure 3 shows the lower slide and the upper slide each all the way out and V—6 moved up and valve V—4 moved left.

Valve V—4 is moved left automatically mechanically at the completion of the outward movement of the upper slide by movements hereinafter described. As the upper slide arrives at the limit of its outward movement V—4 is engaged and mechanically pulled to the left by the movement of the upper slide as hereinafter set forth in the description of the mechanical structure.

Valve V—4 controls the delivery of liquid pressure to cylinder C—4, which in turn controls the movement of the dresser parallel to the axis of the grinding wheel or of the work to move the follower into or out of the work. As V—4 is mechanically moved left it has no exhaust from its left end.

When valve V—4 is mechanically pulled to the left position at the conclusion of the outward movement of the upper slide and as shown in Figure 3 the liquid pressure from lead 60 and 82 and through chamber V—4 to the lower end of chamber C—4, as shown in Figure 2, is reversed. In Figures 1 and 2 this oil pressure is to the lower and of chamber C—4 from 60, through 82, chamber V—4 and lead 131. The pressure in lead 131 and lower end of chamber V—4 is shown as blocked through lead 130 by ball check 128, but the pressure moves through line 131 and through resistance 132 and branch line 133 into such lower end of cylinder C—4 from the chamber V—4 as delivered into chamber V—4 from lead 82. Such pressure in the lower end of C—4 has maintained the slides as shown in Figures 1, 2, and 3, with the follower finger 70 withdrawn from the interior of the work as shown in Figures 1, 2 and 3 until the upper slide approaches the limit of its outward movement toward the axis of the grinding wheel.

When valve V—4 is pulled left as shown in Figure 3 the intermediate head of valve V—4 blocks communication between lead 82 and lead 131 through chamber V—4 to the lower end of C—4, as shown in Figure 3, and the pressure into chamber C—4, from chamber V—4 is now through lead 134 into the upper end of chamber C—4. As the piston C—4 is stationary, the entire dresser including both slides moves up (from the position shown in Figure 3 to that shown in Figure 4) parallel to the axis or of the work to move the follower into the interior of the work. The extent of this movement is a predetermined distance. It may be 1¾ inches. The distance would of course depend upon the position of the dresser on the grinder with respect to the work. Figure 3 shows valve V—4 moved left but before pressure has built up C—4 to shift the dresser axially of the work. Figure 4 shows the position of the dresser at the conclusion of this movement with the follower finger moved axially into the interior of the work. C—4 exhausts from the lower end through branch lead 133, lead 130, lifting the ball check 128, through lead 131 and through V—4 and lead 94 to the tank line 66 (Figure 4).

Valve V—4 in moving left exhausts from the right end of its chamber at the left of the head on the right end of the valve, through lead 156, C—3, lead 154, gland and chamber G—1, lifts ball check 155 into lead 146, through chamber V—1, lead 150 which by passes valves V—2 and V—F, lead 126, chamber and gland G—3, valve chamber V—6, branch lead 99, lead 116, chamber and piston C—3, lead 92, valve V—3, lead 94 and into tank line 66.

At the end of this movement of the dresser, which projects the follower into the work, valve V—2 is moved left automatically mechanically from the position shown in Figure 3 to that shown in Figure 4. This mechanical actuation of V—2 is hereinafter described in the description of the mechanical structure and occurs during the final stage of the movement of the dresser axially toward the work. Such movement of valve V—2 permits the delivery of oil pressure into lines that will produce reverse movement of the upper slide of the dresser radially of the work and bring the follower into contact with the ground surface of the work as shown in Figure 5.

When V—2 is moved left from the position shown in Figure 3 to that shown in Figure 4, it reverses the pressure coming through the follow valve V—F to chamber C—2, from the left end to the right end of chamber C—2, and as a result the upper slide is actuated to move to the right. This movement of the upper slide continues until the follow valve finger contacts the work. Figure 4 shows the dresser mechanism at the beginning of this movement with valve V—2 moved left but before the upper slide is withdrawn. Figure 5 shows the position of the dresser when the withdrawal movement of the upper slide has progressed sufficiently to bring the follower into contact with the work.

In Figure 3, the pressure is shown as through chamber V—F on to the left end of piston C—2. Figures 4 and 5 show the hydraulic pressure as through V—F on to the right end of C—2. This pressure is from pressure line 60, throttle valve V—T, valve V—3, line 90, through piston and chamber C—3, line 96 from the left end of chamber C—3 through chamber V—6, gland and chamber G—2, line 102, branch line 106, chamber C—1, line 108, through channel 111 around V—F, line 110, chamber V—F, line 112, chamber V—2, line 114 and through resistance 138 and lead 118 to the right end of C—2. As the liquid entering C—2 must pass through the resistance 138 the movement of the slide to bring the following finger into contact with the surface of the work is slowed down to the desired velocity to avoid injury.

During this movement the chamber C—2 exhausts from its left end through line 122, chamber V—2, line 125, V—F (chamber and valve), line 128, G—3 chamber and gland, chamber V—6, branch line 99, line 116, C—3, line 92, chamber V—3 and lead 94 to the tank line 66 as shown in Figures 4 and 5.

When the follow valve finger 70 contacts the ground surface of the work 36 the movement of the finger stops, but the upper slide continues to move in the same direction a slight distance, as for example about one sixteenth of an inch, or until the ports 113 and 135 in the follow valve chamber exactly match the corresponding lands on the follow valve as shown in Figure 6. The upper slide can then go no further for pressure delivery to C—2 is now blocked at the follow valve V—F by the lands on valve V—F closing the ports 113 and 135 which ports control the delivery and the exhaust of liquid pressure through chamber V—F to and from chamber C—2. Thus the slide is brought up against a solid hydraulic stop in C—2 with the piston C—2 shown as disposed at an intermediate position in chamber C—2 (Figures 5 and 6) and the follow valve comes to equilibrium with the pressure on each end of C—2 equal. The particular intermediate position of piston C—2 in the chamber will depend upon the distance the upper slide has been retracted to bring its follower finger into contact with the work.

The pressure of the follow valve finger on the work is taken by a light spring 142. The follow valve finger 70 is brought slowly into yielding contact with the ground surface of the work and upon movement of the finger relative to the dresser assembly, as hereinabove set forth, actuates the follow valve to interrupt the delivery of pressure within the dresser to C—2 and bring the withdrawal movement of the dresser slides to a stop.

In Figure 5 channel 111 about the valve V—F is open about the valve but not open into the chamber V—F thereby allowing liquid flow therethrough from lead 108 into lead 110 for delivery into the right end of C—2 as hereinabove set forth. When valve V—F moves left relative to the dresser not only are the ports 113 and 135 blocked by the corresponding lands on the valve but the land at the left end of the valve cracks open the channel 111 to the chamber portion to the right of such land all as shown in Figure 6 as compared with Figure 5. The liquid pressure is then into this chamber portion and from this chamber portion of V—F to the left end of valve V—1 to push valve V—1 from the left position as shown in Figure 5 to the right as shown in Figure 6. Figure 6 shows V—F in equilibrium and V—1 moved to the right. V—1 is mechanically actuated to the left. V—1 is moved to the right for the purpose of permitting pressure to enter the right end of chamber C—1 and move the diamond slide S—1 to the left or out to the dressing position.

Following the movement of valve V—1 to the right the pressure is from G—2 through line 102, through an intermediate portion of chamber V—1, line 146 outlet of which into chamber G—1 is blocked by ball check 155 and through branch line 148 into the right end of chamber C—1 moving the diamond slide S—1 out or to the left as shown in Figure 6. As valve V—F is moved left mechanically by contact of the finger 70 with the work it has no exhaust in this movement. V—1 has no exhaust when moving to the right.

The movement of V—1 to the right diverts the pressure coming from G—2 through line 102, through V—1 and through line 104 into the left end of C—1 from the left end of C—1 (Figure 5) where it held the diamond 68 in or to the right, to the right end of C—1 (Figure 6) as hereinabove set forth and the diamond moves left into line with the follow valve finger which is in contact with the ground face of the work. When the diamond is in line with the follow valve finger it is in the correct position for dressing. The diamond is therefore always brought to the correct position for dressing as determined by the follow valve finger. C—1 moves the diamond slide S—1 hydraulically the same distance at all times, i. e., the extent of movement of the diamond slide S—1 to the left is predetermined, to project the diamond beyond the face of the dresser to the same line that the follower projects therebeyond. The projection of the follow valve finger 70 beyond the face of the upper slide is predetermined. It is the return or withdrawal movement of the upper slide which is variable. In moving left the piston C—1 of the diamond slide S—1 acts as a valve closing off the oil supply to the follow valve V—F from line 106 through line 108.

C—1 exhausts from the left end through line 104, through chamber and piston V—1, through lead 150 by-passing V—2 and V—F, through lead 126, G—3 (chamber and gland), through V—6, branch line 99, line 116, C—3, line 92, through V—3 and branch lead 94 to the tank line 66.

As the piston C—1 reaches the end of its out stroke it uncovers a port 151 at the right end of cylinder C—1 and allows oil pressure to go from chamber C—1 through line 152, through chamber and gland G—1, line 154, piston C—3, line 156 to the left end of the head on the right end of valve V—4 which valve V—4 is then moved to the right (Figures 6 and 7). Figure 5 shows valve V—4 at the left. V—4 has no exhaust when moving right.

As heretofore set forth valve V—4 controls delivery of pressure to piston C—4 and as valve V—4 moves to the right (Figures 6 and 7) it reverses the pressure into C—4 from the upper end to the lower end thereof. The pressure through V—4 from the throttle valve V—T is now applied to the lower end of C—4 and moves the dresser axially to withdraw the follower from the work. This axial movement of the dresser continues and moves the diamond 68 across the face of the wheel 40. This movement is the dressing stroke.

Pressure is delivered into the lower end of chamber C—4 from throttle valve V—T, through line 82, chamber V—4, line 131 and resistance 132 so that the diamond moves slowly across the face of the grinding wheel. C—4 exhausts from the upper end when moving from the position shown in Figure 6 through that shown in Figure 7, through line 134, chamber V—4, branch 67 of tank line 66 into such tank line and back to the tank (Fig. 7).

As the finger 70 leaves the work the spring 142 on the follow valve moves the follow valve and finger to the right the $\frac{1}{16}$ of an inch which they had moved left relative to the dresser upon contact of the finger with the work surface. This movement is from the position shown in Figure 6 to that shown in Figure 7, opening the ports 113 and 135 and closing the channel port 111 to that portion of the chamber V—F adjacent thereto so that the follow valve V—F is placed in a position of readiness to permit fluid pressure delivery therethrough to the right end of C—2. Pressure delivery through V—F to the right end of C—2 will cause retraction of the upper slide S—2, however restoration of the oil pressure through V—F to C—2 is temporarily blocked at the diamond cylinder C—1 by the piston C—1 blocking communication between branch line 106 and lead 108 as hereinabove described as shown in Figures 6 and 7. Delivery of pressure to the right end of C—2 continues blocked until the diamond dresser 68 has completed its dressing stroke across the face of the grinding wheel 40.

When this dressing stroke has been completed, that is after the diamond dresser 68 has been passed across the face of the grinding wheel, (shown in Figure 7 in the act of passing thereacross) valve V—1 is automatically mechanically moved to the left as hereinafter described. This movement of V—1 to the left, shown as completed in Figure 8, reverses the pressure from G—2 and 102 through V—1 from the right end to the left end of C—1 and retracts the diamond.

During the dressing stroke the pressure through V—1 has been, as shown in Figures 6 and 7, on the right end of C—1 through lines 146 and 148, but upon movement of valve V—1 to the left the pressure is shifted to the left end of C—1 and now passes through line 104 from V—1 to the left end of C—1 as shown in Figure 8. As V—1 is moved left mechanically the right end of chamber V—1 exhausts through line 144, chamber V—F, by pass line 145, chamber V—F and valve V—F, and out of chamber V—F into line 126, G—3 chamber and valve, chamber V—6, line 116, chamber C—3, line 92, chamber V—3, line 94 and into tank line 66.

C—1 exhausts out of the right end through lines 148 and 146, through chamber V—1, (Figure 8) through line 150 by passing V—2 and V—F, through line 126, through G—3 through V—6, line 116, C—3, line 92, and V—3 to the tank line 66.

This withdrawal movement of piston C—1 to the right opens the pressure line again from G—2 to the follow valve V—F through chamber C—1 and connecting lines 102, 106 and 108. Since V—F again is receiving pressure it is delivered from V—F through line 112 to V—2 and lines 114 and resistance 138 to the right end of chamber C—2 causing the upper slide to start to retract.

C—2 exhausts from its left end through line 122, chamber V—2, line 125 into V—F, line 126, and through G—3, V—6, C—3 and into tank line 66 as heretofore described. The upper slide continues retracting until piston C2 reaches the left end of chamber C—2 as shown in Figure 9 which shows the hydraulic system at the conclusion of movement of the upper slide to the right but before the lower slide starts to move to the right.

As the upper slide completes its movement to the right all movement in the dresser stops just long enough to build up the pressure inside the dresser to equal that on the outside (as the oil stops flowing inside the dresser the pressure rises) which shifts the sequence valve V—S right from the left position as shown in Figure 9 to the right position as shown in Figure 1. As V—S moves to the right it places the line 88 in communication with line 86 through chamber V—S as shown in Figure 1 and establishes communication from the pressure line 60 with the left end of V—3 and moves V—3 to the right (Figure 1). The liquid in the right end of V—S backs up into the system. The movement of V—S to the right (the liquid in the right end of V—3 backs up into the line 62) reverses the pressure to C—3 to withdraw the lower slide. This reversal of pressure to C—3 also reverses the pressure to V—6.

Throughout the cycle just described the pressure has been on the left end of piston C—3 and therefrom to the lower end of V—6 holding valve V—6 as shown in Figures 4 through 9. The pressure now goes from V—3 through line 92 to the right of the head of piston C—3 and the lower slide is retracted or moved from the position shown in Figure 9 to that shown in Figure 1. The pressure in C—3 also continues through 116 to the upper end of V—6, forcing it down and placing the system in the starting position. At the conclusion of the lower slide retracting stroke, V—2 is moved mechanically to the right, from the position shown in Figure 9 to that shown in Figure 1, as hereinafter described thereby placing the system in the position shown in Figure 1 and in readiness for the next dressing cycle. V—2 needs no exhaust from its right end. As the dresser is withdrawn to the right over piston C—3, the left end of chamber C—3 exhausts through lead 90 and through V—3 and branch 94 into tank line 66.

In summary, when the internal grinder is operating and the dresser mechanism is idle and the impulse valve 64 is closed, pressure is normally maintained in the hydraulic system through line 60 to hold valves V—S and V—3 to the right and such pressure also acts upon pistons C—3 and C—4 and holds the dresser mechanism withdrawn away from the work, all as shown in Figure 1.

When valve 64 is opened and an impulse is received in line 62, valve V—3 is moved left shifting the pressure through V—3 from the line 60 from the right end to the left end of piston C—3 and the lower slide S—3 moves out normal to the axial line of the work as shown in Figures 2 and 3.

The lower end of piston V—6 is also under pressure from C—3 and when the lower slide reaches its limit of outward movement this pressure builds up and shifts valve V—6 upwardly permitting exhaust from the right end of chamber C—2 (the left end of such chamber is already under pressure) and the upper slide S—2 moves out to the position shown in Figure 3.

When the upper slide has moved out, valve V—4 is automatically mechanically shifted to the left, thereby shifting the hydraulic pressure from the lower end of chamber C—4 as shown in Figures 1 and 2 where it has held the dresser withdrawn away from the work, to the upper end of chamber C—4, as shown in Figures 3 and 4, shifting the dresser axially of and toward the work and moving the follower finger into the interior of the work as shown in Figure 4.

At the conclusion of this axial movement of the dresser, which projects the follower finger into the work, valve V—2 which has heretofore been at the right as shown in Figures 1, 2 and 3, is shifted automatically mechanically to the left as shown in Figure 4, thereby shifting the hydraulic pressure from the left end of chamber C—2, where it held the upper slide outwardly, to the right end of chamber C—2, where it functions to slowly withdraw the upper slide and bring the follower finger 70 into contact with the surface of the work as shown in Figure 5. When the follower finger contacts the surface of the work its movement stops but the upper slide S—2 continues to withdraw over the follow valve V—F until the lands on the valve block the ports 113 and 135 in the chamber V—F thereby blocking the delivery of pressure to chamber C—2 and bringing the upper slide to a hydraulic stop.

During these preceding movements the pressure within the dresser has been through valve V—1 upon the left end of the diamond slide piston C—1 holding the diamond slide S—1 withdrawn inwardly away from the work as shown in Figures 1 through 5. When the upper slide S—2 is withdrawn over the follow valve V—F pressure delivery is established through V—F with the left end of chamber V—1 moving valve V—1 to the right as shown in Figure 6. When V—1 is shifted to the right pressure delivery therethrough is shifted from the left end to the right end of diamond slide piston C—1 and the diamond slide S—1 is projected to the left as shown in Figure 6.

Movement of the diamond slide piston C—1 to the left establishes pressure communication with the valve chamber V—4 and shifts V—4 to the right. Shifting of V—4 to the right shifts the pressure from the upper end of C—4 to the lower end thereof and the dresser is withdrawn axially away from the work moving the follow valve finger 70 out of the work and moving the diamond slide 68 across the face of the grinding wheel as shown in Figure 7.

When the dresser completes this axial dressing movement the valve V—1 is shifted automatically mechanically to the left thereby shifting the pressure delivery from the right end to the left end of diamond slide piston C—1 and withdrawing the diamond away from the grinding wheel as shown in Figure 8.

When the diamond slide piston is withdrawn, pressure communication with the follow valve chamber which had been blocked by projection of the diamond slide is re-established and as the follow valve upon withdrawal of the finger from the work has shifted within its chamber under the influence of its spring to reopen ports 113 and 135, pressure is established with the right end of chamber C—2, and the upper slide S—2 is withdrawn to the position shown in Figure 9.

When the upper slide completes its movement of withdrawal the movement of the dresser mechanism temporarily stops until the pressure within the dresser builds up to equal the pressure outside of the dresser. This build-up of pressure within the dresser shifts the sequence valve V—S from the left as shown in Figures 2 through 9 to the right as shown in Figure 1. Shifting V—S to the right establishes pressure communication with the left end of valve V—3 and V—3 shifts to the right and this establishes pressure communication with the right end of piston C—3 and the lower slide is withdrawn from the position shown in Figure 9 to that shown in Figure 1, thereby completing the dressing cycle.

Mechanically the dresser comprises an assembly which may be suitably mounted upon a base or supporting casting 200 as here shown in Figures 12 and 18, which base forms a part of or is carried by the grinding wheel head housing 38 (Figure 10). This grinding wheel head housing is adjustable in a direction parallel to the axis of the grinding wheel, as heretofore set forth, to accommodate long or short grinding wheel carrying quills and as the dresser unit is carried by the grinding wheel head housing, such dresser unit is therefore adjusted with the grinding wheel head.

The dresser assembly is carried by a saddle casting 206, which saddle casting is slidably adjustably supported upon the base 200. The base is provided with a supporting front rail 202, and a parallel supporting rear rail surface 204 (Figures 11, 12 and 18) which rail surfaces 202 and 204 extend in a direction parallel to the axis of the grinding wheel. The saddle casting 206 is supported upon these rail surfaces 202 and 204 for manual slidable adjustment thereover in a direction parallel to the axis of the grinding wheel and it may be secured at adjusted positions by means of screw studs 208 (Figures 11, 12 and 18) to suit different lengths of grinding wheel carrying quills or to suit different length pieces of work.

Slidably supported upon the saddle casting 206 for hydraulic reciprocation thereover in a direction parallel to the slidable movement of the saddle casting itself is a bed plate 210. This bed plate supports the two slide assemblies (S—2 and S—3) to travel therewith and for unitary travel thereover. The bed plate 210 and the slide assemblies S—2 and S—3 are hydraulically shifted as a unit parallel to the axis of the grinding wheel in response to liquid pressure acting within the piston and cylinder assembly C—4 as has been hereinabove described in connection with the description of the process.

The piston and cylinder assembly C—4 is shown as mounted upon the front end of the bed plate. It comprises a cylinder block 212 secured to the forward end of the bed plate and depending therebelow. This block is machined to provide the cylinder bore C—4. The block 212 has a V-shaped bottom face which forms slidable contact within a V-shaped way 214 formed in the saddle casting 206 as shown in Figs. 12 and 18. This V-shaped bottom face of the block 212 constitutes one of the two supports for the hydraulic slidable movement of the bed plate. The second supporting surface for such slidable movement is formed by a bearing surface 216 disposed on the upper face of the saddle casting (Figures 12 and 18) and upon which surface 216 the bed plate itself slidably rests.

217 is a guide bar secured to the underside of the bed plate and having a projecting rib portion 219 that travels through a channel or way in the adjacent edge of the saddle casting as shown in Figures 12 and 18. 218 indicates a dust cover for the cylinder block 212 (Figures 11, 12 and 18).

The cylinder block 212 is bored out interiorly to form the cylinder bore C—4 (Figure 11). The ends of the bore are closed by end plugs 220 and 222. Piston C—4 mounted within the bore has a rod portion 223 which extends slidably through the end plug 222. This piston rod 223 is fixed at its outer end to a stationary bracket 224. This bracket is fixed to the saddle casting 206 by screw stud 226 or the like, all as shown in Figures 11 and 18. The piston C—4 is therefore stationary with the saddle casting. The cylinder block 212 telescopes slidably over the piston C—4 and carries therewith the bed plate and superimposed slides S—2 and S—3. The cylinder C—4 is provided as shown in Figure 11 with suitable ports 133 and 134 which correspond to correspondingly numbered leads shown in Figures 1 through 9 to admit liquid thereto and exhaust liquid therefrom as described in connection with the description of such Figures 1 through 9.

The bed plate also carries the cylinder valve block 228 within which the valves V—S, V—T, V—3 and V—4 are disposed. This valve block is shown as positioned at the rear end of the bed plate. The cylinder block 228 is shown as secured to and supported by the rear end of the bed plate 212 and depends therebelow as shown in Figures 12 and 18. This block 228 is bored out to provide the cylinder bores V—S, V—T, V—3 and V—4. Within these bores are mounted correspondingly identified valve pistons as shown in dotted outline in Figure 17 and as shown more particularly in Figures 1 through 9.

Such bores are provided with ports as more particularly indicated in the diagrammatic views of Figures 1 through 9. Valve chamber V—S is shown in Figure 17 as having ports, 76, 84, 86 and 88 which correspond to similarly numbered leads shown as opening thereinto in Figures 1 through 9. Valve chamber V—T is shown in Figure 17 as having ports 78 and 80 which correspond with similarly numbered leads thereinto shown in Figures 1 through 9. Valve chamber V—3 is shown in Figure 17 as having ports 66, 82, 88, 90, 92 and 94 which correspond with similarly numbered leads thereinto shown in Figures 1 through 9.

An end plate 230 is secured to one end of the block 228 closing the bores V—S, V—T, V—3 and V—4 (Figures 12, 17 and 18). This plate is shown as provided with a threaded passageway within which is received a removable plug 232 to permit access to the end of the manually adjustable throttle valve V—T for its manual adjustment as heretofore described.

Valve piston V—4 is shown in Figure 1 through 9 and in Figures 12, 17 and 18, as having an end portion 234 which projects beyond the forward end of the block 228 and exhibits a channel within which a fork 236 of an actuating link 238 is engaged to actuate the piston. The link 238 is slidably supported upon one side of the bed plate 210 as shown in Figures 17, 18 and 19. The link is supported by screws 240 fastened to the bed plate. These screws pass through elongate slots 242 formed in the link whereby the link is capable of limited slidable movement with respect to the bed plate. The opposite end of the link is provided with an upturned angular shoulder 244 which shoulder is adapted to be engaged by a stop 246 carried by the upper slide S—2. When the slide approaches its limit of outward movement over the bed plate the stop 246 engages the shoulder 244 and picks up the link and shifts the link to mechanically actuate the valve V—4 as heretofore described and as shown in the diagrammatic view of Figure 3. The valve pistons V—3 and V—S are shifted in both directions hydraulically.

The bottom surface of the bed plate is provided with a transverse way within which is disposed a slidable plate 239 (Figures 13, 14, 17 and 20) which plate cooperates with valve operating cams during the movement of the bed plate as hereinafter described. This plate has angularly upturned end portions 241 and 243 (Figures 12, 17, 18, 19 and 20). This plate has a length between the end portions greater than the width of the bed plate (Figure 20) where the plate 239 crosses the bed plate so as to have permitted relative movement with respect to the bed plate. The plate 239 is provided with a linear slot 245 into which projects a stop pin 247 which pin projects upwardly from and is carried by the saddle casting. This pin 247 limits the slidable movement of the plate 239 transversely over the saddle casting as the plate 239 is moved with the bed plate over the saddle casting, while permitting the bed plate to continue its movement thereover, for purposes hereinafter described. The upstanding end portions 241 and 243 of the plate 239 cooperate with the cams carried by the upper slide S—2, which upper slide moves with the bed plate, to actuate such cams to operate valves as described herein.

Fixed to the upper surface of the bed plate 210 are a pair of parallel spaced apart guide rails 248. These guide rails serve to guide the travel of the lower slide S—3 over the bed plate as the slide is hydraulically projected or withdrawn normal to the axial line of the grinding wheel as set forth in the description of Figures 1 through 9. Spaced between these rails and parallel thereto a key way 249 is formed in the upper surface of the bed plate (Figures 14 and 17). A key 255 depends below and is carried by the lower slide and is adapted to travel through the key way as the lower slide travels over the bed plate. This key 255 is adapted to engage the stop 251 to limit the forward travel of the lower slide over the bed plate.

The piston of the piston and cylinder assembly C—3, which is the piston and cylinder assembly that actuates the lower slide, is fixed to the bed plate by two cooperating supporting blocks, identified as a unit as 258. These blocks are fixed to and superpose the rear end of the bed plate. These blocks support the piston assembly C—3 as shown in Figures such as 17, 18 and 19. A stop block 259 is fixed to the bed plate at one end of the blocks 258 as shown in Figures 17, 18 and 19 which stop block is adapted to be engaged by cam 302 as hereinafter described. The bed plate assembly therefore includes the bed plate 210; the piston and cylinder assembly C—4 which extends transversely across and below the forward end of the plate, the valve assembly including the valves V—T, V—S, V—3 and V—4 supported below the rear end of the plate, and the piston assembly C—3 which piston assembly is supported between the blocks 258 upon the rear end of the bed plate to extend forwardly spaced between the rails and spaced above the bed plate. The lower slide which is slidably supported upon the bed plate, exhibits a cylinder chamber which is telescopically slidable over this piston assembly C—3.

Slidably supported upon the bed plate between the rails 248 for hydraulic reciprocating movement thereover normal to the axis of the grinding wheel is the lower slide assembly S—3. This slide assembly comprises a rectangular cylinder block 250 which is slidably supported upon the bed plate 210 between the guide rails 248 as shown in Figures 11 and 20. This block is bored out to form the cylinder bore 261 which bore constitutes the cylinder chamber of the cylinder and piston assembly C—3.

To the upper face of the block 250 is fixed a plate 252, which plate is dove-tail shaped in cross section as shown in Figure 20. This plate 252 extends to the rear beyond the end of the block 250 as shown in Figures 18 and 19. A block or standard 253 is supported upon the rearward extension of this plate 252 (Figures 12, 13, 14, 18 and 19). This block 253 supports the pistons of glands G—1, G—2 and G—3. It also supports the piston of the piston and cylinder assembly C—2 as is hereinafter more particularly described in connection with the description of the upper slide S—2. Within this block 253 is also located the valve mechanism V—6 heretofore referred to in connection with Figures 1 through 9.

The forward end of the bore 261 within the block 250 is closed by an end plate 254 (Figures 11 and 14). The rear end of the bore is closed by an end plug 257 (Figure 14). Through this plug 257 the piston assembly C—3 slidably extends. This plug 257 carries the stop 255 which depends below the block 250 as shown in Figure 14 and which fixed stop is adapted to contact the stop 251 to limit the forward movement of the lower slide as heretofore described. This plug 257 is counterbored and within the counterbore is fitted a packing seal 259 which surrounds the piston tube 265. A packing nut 256 holds the packing seal 259 in place.

The piston assembly C—3 is supported at its rear end between two blocks 258 which blocks are shown in Figures 12, 14 and 18 as superimposed and secured together and fastened to the bed plate 210 as hereinabove set forth. The piston assembly C—3 is fixed and held between these blocks stationary with the bed plate while the lower slide S—3 is permitted relative telescopic movement over the piston. The lower slide embodies the cylinder C—3 and in turn supports the upper slide S—2 to travel therewith and for slidable movement thereover.

The piston and cylinder assembly C—3 is primarily provided to reciprocate the lower slide S—3 but it also provides passageways for the controlled flow of liquid therethrough to and from other functioning parts of the dresser mechanism. When the fluid pressure is upon one side of the piston head C—3 the lower slide is moved in such direction. When the fluid pressure is upon the opposite side of the piston head the lower slide is moved in such opposite direction. This piston and cylinder assembly serves the function, by virtue of the multiple fluid passageways therethrough, of directing fluid pressure into suitable leads included in the hydraulic diagram views of Figures 1 through 9. It was stated in the discussion of the hydraulic diagrams that such diagram views did not agree precisely with the mechanical structure herein disclosed. Figure 14, which shows the piston and cylinder assembly of C—3, was the mechanical view which called particularly for such statement. The piston and cylinder assembly of C—3 and particularly the construction of the piston assembly is shown in Figures 14, 15, 15A and 15B.

The piston assembly C—3 includes a piston head 263 which is mounted upon the end of the large piston tube 265 and is slidably supported within the bore 261. The piston head 263 is cored out, being tubular in cross section, and the tubular opening through the head is closed ahead of the tube 265 by a plug 267. This plug 267 has a flattened diametric rearward extension 268 which projects into the end of the tube 265 and serves as an end support for liquid passage tubes 271 and 273 which tubes extend through the large tube 265 as shown in Figure 14.

The opposite and rear end of the large tube 265 is provided with a stationary support between the two retaining blocks 258 as shown in Figures 14 and 19, and as hereinbefore described. It will be noted from Figure 19 which is a plan with the two slides extended forward that these supporting blocks 258 have a central portion which extends forwardly and this central portion is visible in elevation in Figures 12 and 16 and the tube 265 is not visible in Figures 12 or 16. The rear end of the tube 265 is closed by a plug 275 fixed therein. This plug 275 serves as a support for the rear ends of the tubes 271 and 273.

The interior of tubes 265, outside of the tubes 271 and 273 which extend therethrough, defines the C—3 piston portion of the passageway 92 shown in diagrammatic Figures 1 through 9 and has an outlet port 277 (Figures 14 and 15). This outlet port is through the wall of tube 265 and through the reduced thickness surrounding wall of the piston head 263 into that portion of the bore 261 which surrounds the tube 265 and which is to the rear of the head 263 as shown in Figures 14 and 15. This portion of the bore 261 which surrounds the tube 265 is identified in diagrammatic Figures 1 through 9 as chamber C—3 and liquid pressure is built up therein to cause withdrawal of the lower slide to the position shown in Figures 1 and 14. This tube 265 has a fluid inlet 279 at the rear end through the block 258 and which inlet corresponds to that portion of lead 92 that extends from the valve V—3 as shown in the diagrammatic views.

Tube 271 which is supported at its forward end by the extension 269 of the plug 267 and which is supported at its rear end by the plug 275 defines the C—3 piston portion of the passageway 90 in the diagram Figures 1 through 9. At the forward end this tube 271 has an outlet port 281 through the piston head into that portion of the bore 261 surrounding the reduced forward end portion of the piston 263 (Figure 14) to deliver liquid pressure into the forward end of the bore 261 ahead of the piston to project the lower slide to the position shown in Figure 3. The inlet into the rear end of the tube 271 is through the block 258 and plug 275 and is identified as 90 being the same numeral used in the diagrammatic Figures 1 through 9 to identify the lead from V—3.

Passageway 96 leads through the lower slide block 250 and plate 252 and through port 96 into the bore 261 adjacent to its forward end. This bore 261 is identified in the diagram views as chamber C—3. Such bore 261 is provided with a port adjacent to its rear end identified as 116. These ports 96 and 116 correspond with the lead numbers 96 and 116 in Figures 1 through 9.

Tube 273 defines the C—3 piston portion of the passageway identified as 156 upon the diagram views Figures 1 through 9. This tube is provided with an inlet port at the forward end from the bore 261 or chamber C—3, it being a return line as shown in Figures 1 through 9. This port is identified in Figures 14 and 15A as 283 and extends from the tube 273 through the tube 265 into the bore 261 (Figure 14) or chamber C—3 of the diagrammatic views of Figures 1 through 9. The opposite end of the tube 273 has an outlet through plug 275 and blocks 258, which outlet is identified as 156 and corresponds to that portion of lead 156 which extends to V—4 in the diagram Figures 1 through 9.

The upper slide S—2 is supported upon the upper surface of the plate 252 of the lower slide for slidable movement thereover parallel to the line of slidable movement of the lower slide as shown in Figures 11 and 20. The upper slide includes the piston and cylinder assembly C—2, the valves V—1 and V—2, the glands G—1, G—2 and G—3, and also the diamond slide S—1 and the follow valve V—F.

This upper slide is shown as including a lower block 260 and an upper block 262 which blocks are secured together and slide as a unit. The lower block 260 is in the shape of an inverted U in vertical end elevation as shown in Figures 11 and 20 and overhangs the opposite sides of the plate 252 and the cylinder block 250 of the lower slide and terminates spaced above the rails 248. It fits slidably about the lower slide block 250 and plate 252 for linear slidable movement thereover. In vertical side elevation this lower block 260 is stepped having a forwardly projecting undershot portion as shown in Figures 12 and 18. The upper block 262 is rectangular in cross section as shown in Figures 12, 13 and 18.

The lower half of this lower block 260 which includes the forwardly extending undershot portion and which overlaps on both sides the lower slide block 250 contains the follow valve assembly V—F disposed on one side of the lower slide block 250 and the diamond slide assembly S—1 disposed on the opposite side of the lower slide block 250 as is shown in Figure 11. The upper half of this lower block 260 contains the piston and cylinder assembly C—2 disposed directly above the lower slide block 250 and on opposite sides of this piston and cylinder assembly C—2 are disposed the valves V—1 and V—2 as shown in Figure 11. The upper block 262 contains the glands G—1, G—2 and G—3 arranged in a horizontal plane as shown in Figure 11.

A rectangular plate 264 is secured across the front face of the upper rear portion of the lower block 260 to close the bore passageways therethrough and through the bushings disposed within said bores as shown in Figures 11, 14 and 16. A rear plate 266 (Figures 12, 14, 18 and 20) is secured to the rear face of block 260 about the piston rod of piston C—2 which projects therethrough holding the sealing element 276 in place about the piston rod against the plug 278 which is received within the bore 288.

As shown in Figures 11, 13, 14 and 16, a front plate 268 is secured over the front face of the upper block 262. This plate closes the bores through the block and holds sealing elements 270 in place surrounding the gland pistons G—1, G—2 and G—3 which gland pistons project through the plate 268 as shown in Figures 13, 14 and 16. Over the rear face of this upper block 262 is secured a plate 272 through which the gland pistons G—1, G—2 and G—3 extend. This plate 272 holds sealing members 274 in place about the gland piston rods as shown in Figures 13, 14 and 16.

The upper slide is reciprocated over the lower slide as hereinabove set forth by liquid pressure within the cylinder C—2 upon one side or the other of the head of the piston C—2. Piston C—2 (Figure 14) includes the piston rod 284 which carries the piston head 286. The piston is slidably mounted within the bore 288 of the block 260, which bore in the diagrammatic views of Figures 1 through 9 is identified as the chamber C—2. The rear end of the chamber C—2 or bore 288 is closed by a plug 278 through which the piston rod 284 slidably extends. This piston rod 284 extends through and is secured to the supporting block or standard 253 which standard is fixed to the rearward extension of the plate 252 which plate forms a part of the lower slide. The piston rod 284 is therefore fixed to the lower slide and the upper slide block 260 telescopes slidably thereover.

There is a port 122 into the forward end of the bore 288 ahead of the piston 286 which port forms the opening into the chamber C—2 of lead 122 as shown in Figures 1 through 9. There is a port 118 into the bore 288 behind the piston 286 which port forms the opening into the rear end of the chamber C—2 of lead 118 as shown in Figures 1 through 9. The admission of liquid into and the exhaust of liquid from both ends of the chamber C—2 through these ports 118 and 122 to advance and withdraw the upper slide over the lower slide has heretofore been described in the description of Figures 1 through 9.

Within the block 260 of the upper slide and illustrated as disposed in the same horizontal plane as the piston chamber C—2 is the valve V—2. The valve V—2 is adapted to be mechanically actuated in both directions as hereinafter described in the description of the mechanical valve actuating mechanism. The valve controls the flow of liquid therethrough to and from the cylinder C—2 to control the advance and withdrawal of the upper slide relative to the lower slide.

To form the valve V—2 the block 260 is bored out and a cylindrical bushing 290 is received therein. Within the hollow interior of this bushing is mounted the valve piston V—2 identified in Figure 13 as 292. The bushing 290 is provided with ports and passageways which correspond with the illustration in the diagrammatic Figures 1 through 9. Ports 112, 114 and 122 are shown, being openings of the passageways 112, 114 and 122, respectively, as illustrated in Figures 1 through 9. Ports 124 and 125 are shown, being the openings of the passageways 124 and 125, respectively, illustrated in Figures 1 through 9.

The valve piston 292 projects at both ends beyond the bushing 290. The projecting rear end portion is provided with an encircling groove or channel 294 within which a pin 296 of a vertically disposed cam shaft 298 is seated to actuate the valve piston. The pin 296 is radially offset the axis of the shaft 298 as shown in Figure 13. The shaft 298 is rotatably vertically journaled within a bearing block 300 which block is fixed to the rear end of the upper slide block 260. At its upper end above the block 300 the shaft is fitted with a cap 299 which cap carries the pin 296. At its lower end the shaft is provided with a cam 302. The cam is so positioned as to be mechanically actuated by contact with the end 243 of slidable plate 239, as hereinafter described, to rotate the shaft to shift the valve piston V—2 axially as described in connection with Figures 1 through 9.

The valve piston 292 is provided with an intermediate land 304. The ports 114 and 122 which are shown in dotted outline on opposite sides of this land are ports through the bushing 290, not ports into the valve piston. On opposite sides of this land the valve piston is cut away presenting two portions of reduced diameter as shown in Figure 13 and as illustrated in Figures 1 through 9.

Within the block 260 and on the opposite side of the piston C—2 and in the same horizontal plane with the piston and cylinder C—2 and the valve V—2 is the valve V—1. Valve V—1 is mechanically actuated in one direction and hydraulically actuated in the opposite direction. This valve controls the delivery of liquid pressure to and from the piston C—1 to operate the diamond slide S—1.

To form the valve assembly V—1, the block 260 is bored out and a cylindrical bushing 306 is received therein. Within this bushing a valve piston 308 is mounted. This valve piston projects at the rear end beyond the end of the bushing and such projecting end portion is provided with an encircling groove or channel 310. Within this channel a pin 312 is seated to actuate the piston. This pin is carried by a cam shaft 314 which shaft is rotatably vertically journaled within a bearing block 316 which block is secured to the rear end of the upper slide block 260. The pin is offset the axis of the shaft as shown in Figure 16. The upper end of the shaft 314 above the block 316 is fitted with a cap 315 which cap carries the pin 312. A cam 318 is secured to the lower end of the shaft 314 and this cam is adapted to be actuated mechanically upon contact with the end 241 of the slidable plate 239 as hereinafter described to rotate the shaft 314 to actuate the valve piston 308 to the left. V—1 is hydraulically actuated to the right.

The bushing 306 is provided with ports and passageways therethrough corresponding to the ports and passageways illustrated in the diagrammatic views of Figures 1 through 9. In Figure 16 the bushing is shown as provided with ports 102, 104, 144, 146 and 150, which ports represent the openings of the correspondingly numbered leads shown in Figures 1 through 9.

The piston 308 is provided with two intermediate lands 320 and 322 spaced apart by a portion of reduced diameter and a portion of reduced diameter abuts each land on the opposite side. The valve piston 308 is likewise provided with a passageway 324 extending through an intermediate portion and bridging both lands and opening into the chamber through the reduced portions of the piston beyond both lands as shown in Figure 16 and also as shown in Figures 1 through 9.

To form the valve assembly V—F that portion of block 260 which overhangs the lower slide block 250, upon the side of the dresser illustrated in Figure 18, is bored out directly below V—2 to provide the bore 326 (Figure 13) which bore constitutes what is termed the valve chamber V—F in Figures 1 through 9. This bore 326 extends for the full length of block 260 including the undershot portion as shown in Figure 10. A valve piston 328 is slidably supported within this bore 326 and projects beyond the forward end thereof as shown. To this forwardly projecting portion the follow valve finger 70 is secured by a pin 327. The outer end of the bore 326 is closed by the threaded plug 330 through which the valve piston 328 slidably extends.

The outer end of the bore 326 is provided with a counterbored portion 332 and a sleeve 334 is disposed therein slidably surrounding the outer end portion of the valve piston 328. The sleeve 334 is held against a shoulder of the counterbore by an expansion spring 142 which spring is disposed between the sleeve 334 and the plug 330. The sleeve is also held against a shoulder 338 of the valve piston 328 by this same spring. Upon the follow valve finger 70 coming into engagement with the ground surface of the work during the withdrawal movement of the upper slide as heretofore described the valve piston has a permitted axial movement outwardly against the tension of this spring. The spring is sufficiently strong to return the valve piston to the position shown in Figure 13 upon withdrawal of the follow valve finger 70 out of engagement with the surface of the work.

The bore 326 is provided adjacent to the counterbored portion 332 with a bushing 340 which is press-fitted thereinto and which is itself provided with a keyway 342 within which keyway a key 344 carried by the piston is slidable to guide the piston 328 in its slidable movement within the bore.

The rear end of the piston rod 328 is slidably mounted within a bushing 346 which bushing is pressed into the rear end of the bore 326. The cam shaft supporting block of plate 300 extends over the end of the bushing 346 and the adjacent surrounding portion of the end of the upper slide block 260 and is secured to the block as shown in Figures 13 and 20. This bushing 346 is cut away to provide the ports and passageways 110, 111, 113, 126, 135, 144 and 145 to correspond with the similarly numbered ports and passageways shown in Figures 1 through 9.

The rear end portion of the valve piston 328 which is mounted within the bushing 346 is shaped to provide a plurality of lands 348. These lands are spaced apart axially of the piston rod by portions of reduced diameter as shown in Figure 13 and as shown in Figures 1 through 9. This portion of the valve piston constitutes what might be termed the follow valve portion proper. This landed portion of the valve piston is provided with a passageway 350 which extends axially thereof bridging across the two rear lands 348 as shown in Figure 13 and as illustrated in Figures 1 through 9.

When the follow valve finger 70 is brought into contact with the ground surface of the work in the withdrawal movement of the upper slide and the upper slide continues temporarily to be farther withdrawn, the spring 142 yields and the follow valve is shifted axially relative to the chamber within the upper slide and cuts off the delivery of liquid pressure through the follow valve to the piston C—2 thereby stopping farther withdrawal movement of the upper slide. This axial shifting of the follow valve piston within the valve chamber within the upper slide also serves to direct liquid pressure to the valve V—1 to reverse the position of said valve V—1 which in turn serves to so direct the liquid pressure to the piston C—1 as to actuate the piston C—1 to project the diamond slide S—1, all as hereinabove set forth in the description of the diagrammatic views of Figures 1 through 9.

To form the diamond slide assembly S—1, which includes the piston C—1, the undershot portion of the lower block 260 of the upper slide S—2 is cut away on one side as shown in Figures 11, 12, 16 and 19 to provide a slide way 352 on the side face of the block for the diamond slide S—1. This slide S—1 carries the diamond 68. The diamond slide S—1 is of dovetail shape in vertical front elevation as shown in the front elevation view of Figure 11. A retaining plate 354 is secured to the side of the block 260 below the way 352. This plate extends upwardly to overlap one side of the diamond slide to guide the diamond slide in its travel as shown in Figure 11. This plate 354 is shown in Figure 11 as provided with a key 356 which key is engaged within a keyway in the block 260 and the plate is held to the block 260 by screws 358 (Figures 12 and 16). The plate is provided with slots 360 whereby it may be adjusted within the limits of the slots relative to the block 260.

The diamond slide S—1 is provided with a rearwardly projecting externally threaded male portion 362 which has a bored out opening extending therethrough and into the slide block S—1 as shown in Figure 16. Within this bored out opening is disposed an expansion spring 364 which spring seats at one end within the bored out opening and bears at its opposite end against the end of a pilot point 366 of the piston rod 368 of the piston C—1. A sleeve nut 370 is adjustably threaded upon the male portion 362 and also upon the externally threaded portion of the piston rod 368 as shown in Figures 12 and 16 coupling the diamond slide S—1 adjustably to the end of the piston rod 368. The spring 364 tends to exert a pressure upon the end of the piston rod and upon the slide block S—1 to maintain tight fitting engagement of the screw threaded connections therebetween. A guide block 372 is mounted upon the projecting end portion of the rod 368 and one face of this block slidably engages the adjacent face of the upper slide block 260 as the piston C—1 is reciprocated and therefore prevents rotatable displacement of the piston rod 368.

To form the cylinder C—1 the block 260 of the upper slide is machined out as shown in Figure 16 to provide a bore within which the bushing 374 is fitted. This bushing is internally threaded at its forward end to threadedly receive a plug 376, which plug has an enlarged cap portion that abuts against the front end face of that portion of the slide block 260 surrounding the bored out opening within which the bushing is mounted. The piston rod 368 extends slidably through the block 376. A nut 380 is threaded into a counterbored portion of the plug 376 and holds a sealing element 382 in place within the counterbore about the piston rod 368.

The opposite end of the bushing 374 is provided with an outer radially projecting shoulder portion 384 which seats against a counterbored end portion of the bored out opening through the slide block 260 as shown. When the plug 376 is threaded down tightly within the bushing 374 and the cap portion of the plug is drawn against the end of the bored out portion of the block 260, the shoulder 384 of the bushing is drawn tightly against the shoulder formed by the counterbore within the block 260 and the bushing is held securely in place.

This bushing 374 is provided with ports and passageways 104, 106, 108, 148 and 151 therethrough which correspond with similarly numbered ports and passageways in the diagrammatic Figures 1 through 9. A lubrication passageway 105 is shown as extending from the passageway 104 through the bushing and the plug 376 so as to deliver lubricant to the piston rod where it passes through the plug as shown in Figure 16.

As the piston C—1 moves toward the limit of its movement in either direction it tends to restrict the exhaust of liquid from the chamber C—1 through the port 104 or the port 148 ahead of the moving piston and thereby cushions the final movement of the piston toward the end of its stroke. This will be apparent from consideration of Figure 16. The piston is hydraulically actuated by admission of liquid into the chamber C—1 through either the port 104 or the port 148 as described in connection with the description of Figures 1 through 9.

In order to provide communication between the liquid passageways through the lower slide and the liquid passageways through the upper slide at all positions of the upper slide with respect to the lower slide, three trombone type glands identified as G—1, G—2 and G—3 are provided. The gland pistons G—1, G—2 and G—3 are secured to and carried by the supporting block or standard 253 which block is in turn mounted upon the rearward extension of the plate 252 of the lower slide as heretofore described. Each gland piston is provided with a shoulder portion 388 spaced from the end and which shoulder abuts the front face of the supporting block 253 and a cap screw 390 is employed to secure the gland piston to the supporting block 253 as shown in Figure 13.

These glands are of similar construction and each gland piston is provided with a passageway 386 which extends lengthwise of the piston and which passageway communicates through that portion of the piston mounted within the block 253 and the liquid passageway within such block 253 to receive liquid therefrom or to deliver liquid thereto. The opposite end of the passageway 386 extends through a reduced diameter portion of the gland piston to establish communication with the chamber within which the gland piston is disposed.

The upper slide block 262 is machined to provide three gland piston receiving chambers which chambers are disposed in a horizontal plane as shown in Figures 11 and 20. The gland pistons are mounted within these chambers to permit telescopic slidable movement of the upper slide over the gland piston as shown by comparing Figures 12, 13, 14 and 16 with Figures 18 and 19.

The opening of the passageway 386 through each gland piston into the gland chamber within the block 262 of the upper slide is so located that at any telescopic position of the upper slide block 262 over a gland piston liquid communication is maintained through the gland piston between the gland chamber within the upper slide block 262 and the liquid passageway through the supporting block 253 of the lower slide. Passageways 386 through gland piston G—2 and G—3 communicate within the block 253 with chamber V—6. The passageway 386 through gland piston G—1 communicates through the block 253 with the lead 154 which extends to the piston cylinder assembly C—3 as heretofore described.

In the description of the process and as outlined in diagrammatic Figures 1 through 9 it was stated that valves V—1, V—2 and V—4 were mechanically actuated at certain stages of the process. The mechanical actuation of valve V—4 by the slide bar 238 has heretofore been described. Valve V—1 is moved to the left and valve V—2 is moved both to the right and to the left mechanically by the cams 318 and 302 respectively. These movements of these valves have heretofore been described and so has the structure of cams 302 and 318. It has been stated that cam 302 contacts the upturned end portion 243 of the slidable plate 239 and that cam 318 contacts the upturned end portion 241 of the same plate 239 to operate the valves V—2 and V—1 respectively. These cams are actuated by contact with the end portions 241 and 243 of the slidable plate 239 during the operation of the dresser as follows.

When the dressing operation is instituted, the cams 302 and 318 are disposed in the relative position shown in Figures 17 and 21. As the lower slide S—3 which carries the upper slide S—2 moves forwardly over the bed plate in the direction of the arrow in Figure 21, the cams remain in the same angular position shown in Figures 17 and 21 and pass over and between the end portions 241 and 243 of the slidable plate 239 until they reach the position shown in dotted outline in Figure 17. The cams wipe across the end portions 241 and 243 without actuation thereby.

It will be noted that the angular position of the cams is the same in the dotted outline showing thereof. The solid line showing of the cams in Figure 17 illustrates them in the position they occupy when the dresser occupies the position of Figure 1. The dotted line outline of the cams illustrates them in the position they occupy when the dresser occupies the position of Figure 3.

It will be remembered that when the two slides of the dresser arrive at the position shown in Figure 3 they are then moved hydraulically axially of the grinding wheel and in the direction of the arrow in Figure 22 to move the follow valve finger 70 into the interior of the work as has been heretofore described. The slidable plate 239 moves with the bed plate 210 over the saddle casting 206 until the pin 247, which pin is fixed to the saddle casting, abuts the left end of the slot 245 as shown in Figure 22.

At the inception of this axial movement of the dresser mechanism the pin 247 occupies the position shown at the right of the slot 245 in Figure 21. At the inception of this axial movement of the dresser mechanism the cams occupy the relative angular positions shown in Figure 21. At the completion of this axial movement of the dresser mechanism which projects the follow finger into the interior of the work the cam 302 occupies the angular position shown in Figure 22. When the plate 239 has moved with the bed plate sufficiently to change the position of the pin 247 from the right end of the slot as shown in Figure 21 to the left end of the slot 245 as shown in Figure 22, which change of position occurs before the bed plate carrying the two slides S—2 and S—3 has arrived at its limit of movement axially of the work, movement of the slidable plate is stopped by the pin 247. The slides, however, continue until they arrive at their limit of movement and the cam 302 by virtue of its engagement with the upturned end 243 of the slidable plate 239 is rotated from the position shown in Figure 21 to that shown in Figure 22. This partial rotation of the cam 302 actuates the valve V—2 from the position shown in Figure 3 to that shown in Figure 4 of the diagrammatic views. It will be noted that in this position of the slidable plate 239 the cam 318 has been moved to the right away from the upturned end 241 of the slidable plate 239.

The two cams 302 and 318 occupy the relative angular positions shown in Figure 22 through that portion of the operation of the dresser illustrated in Figures 4 and 5. Figure 4 shows the follow finger projected into the interior of the work and Figure 5 shows the follower finger engaging the interior surface of the work. Figure 6 shows the follow valve finger still in engagement with the interior surface of the work but the follow valve piston V—F has been shifted from the position shown in Figure 5 to that shown in Figure 6 as heretofore described. This relative movement of the follow valve piston within its chamber V—F reverses the position of valve V-1 hydraulically, as heretofore described, from the position shown in Figure 5 to that shown in Figure 6. This actuation of valve V—1 rotates the cam 318 from the angular position shown in Figure 22 to that shown in Figure 23 bringing the cam up against the end 241 of the slidable plate 239.

As had been heretofore been set forth the dressing mechanism is now moved axially of the work to withdraw the follower finger over the interior of the work and to pass the diamond across the face of the grinding wheel, which movement constitutes the dressing stroke. During this dressing stroke the bed plate together with the upper slide is shifted axially of the work and in the direction of the arrow of Figure 24.

The slidable plate 239 which is carried by the bed plate 210 arrives at its limit of permitted movement to the left in the direction of the arrow in Figure 23, being stopped by the pin 247 before the bed plate carrying the dresser mechanism arrives at its limit of movement. When the slidable plate 239 stops, further movement of the bed plate which carries the upper slide and the cam mechanism causes the end 241 of the plate 239 to rotate the cam 318 from the position shown in Figure 23 to that shown in Figure 24. This movement of the cam 318 from the position of Figure 23 to that of Figure 24 actuates the valve V—1 from the position shown in Figures 6 and 7 to that shown in Figure 8.

The dressing stroke is now completed and the dresser mechanism is now moved from the position shown in Figure 8 through that shown in Figure 9 to the starting position of Figure 1. It will be noted that cam 302 in Figure 24 is spaced from the end portion 243 of the plate 239 and that cam 302 has occupied the same angular position through Figures 22, 23, and 24. It will be noted that valve V—2 which is mechanically actuated by cam 302 occupies the position of Figure 4 through Figures 5 through 9. When the two slides are completely withdrawn, however, to the position shown in Figure 1, the cam 302 is brought into contact with the stop 259 as illustrated in Figure 17 and this engagement of the cam 302 with the stop, before the slides have arrived completely at the withdrawn position of Figure 1, rotates the cam 302 from the angular position shown in Figures 22, 23 and 24 to that shown in Figure 21. This rotation of the cam 302 from the position shown in Figure 24 to that shown in Figure 21 shifts the valve V—2 from the position shown in Figure 9 to that shown in Figure 1 thereby completing the mechanical actuation of the valves to place them in position for another dressing operation.

What I claim is:

1. Dresser mechanism for an internal grinder having a rotatable wheel dressing element and a work holder adapted to support a piece of work having a cylindrical bore comprising, in combination, a wheel dressing element, a gaging element, means for advancing the gaging element along a line parallel to the axis of the bore and into the bore and along an angular line with respect to the axis of the bore within the bore into contact with the surface of the bore, and means automatically responsive to the engagement of the gaging element with the bore to position the wheel dressing element in alignment with the gaging element on a line parallel to the axis of the grinding wheel.

2. In an internal grinder having a rotatable grinding wheel and a rotatable work holder adapted to support a piece of work having a cylindrical bore, dresser mechanism associated with the grinder provided with a gaging element and a wheel dressing element, means coupled with said dresser mechanism to move the same successively first normal to and toward the projection of the axis of said bore, second, parallel to the axis of the bore and toward the bore, third, normal to and away from the axis of the bore to bring the gaging element into contact with the surface of the bore, and means responsive to interruption of movement of the gage by contact with the surface of the bore operable to move the dresser into alignment with the gage on a line parallel to the axis of the bore and to move the gage and the dresser, parallel to the axis of the bore and away from the bore.

3. Dresser mechanism for an internal grinder having a grinding wheel and a work holder adapted to support a piece of work provided with a cylindrical bore, comprising, in combination, a gage, a wheel dresser, means coupled with the gage and with the dresser to advance them along a predetermined path to bring the gage into contact with the surface of the bore and means responsive to interruption of advance of the gage by contact with the bore to move the dresser into alignment with the gage at the point at which the movement of the gage was interrupted and on a line parallel to the axis of the grinding wheel.

4. Dresser mechanism for an internal grinder having a grinding wheel and having a work holder adapted to support a piece of work provided with a cylindrical bore, comprising, in combination, a gage, a wheel dresser, hydraulic means coupled with the gage to move it successively toward and along and away from the prolongation of the axis of the grinding wheel into contact with the surface of the bore, hydraulic control mechanism responsive to the interruption of the withdrawal of the gage away from the axis of the grinding wheel by contact with the surface of the bore to advance the dresser into alignment with the gage on a line parallel to the axis of the grinding wheel and to advance the dresser along said line.

5. In an internal grinder having a rotatable grinding wheel and a work holder adapted to support a piece of work having a cylindrical bore, dresser mechanism associated with the grinder comprising a primary slide and a secondary slide supported for movement normal to the axial line of the bore and parallel thereto, a gaging element and a wheel dressing element supported by the secondary slide, hydraulic means coupled with said slides to actuate them as a unit and to actuate the secondary slide independently of the primary slide to advance the gaging element into contact with the surface of the bore and hydraulic means coupled with the wheel dressing element to actuate it independently of said slides to advance it into alignment with the gaging element.

6. Dresser mechanism for an internal grinder having a rotatable grinding wheel and a rotatable work holder adapted to support a piece of work having a cylindrical bore, comprising a primary slide and a secondary slide supported for movement normal to the axis of the grinding wheel and parallel thereto, a gaging element and a wheel dressing element supported by the secondary slide for movement therewith and independently thereof, hydraulic means operable to actuate said slides as a unit normal to the axial line of said bore and parallel thereto and operable to actuate the secondary slide independently of the primary slide to advance the gaging element into contact with the surface of the bore, said hydraulic means operable to actuate said wheel dressing element independently of said slides to advance it into alignment with the gaging element.

7. In an internal grinder having a rotatable grinding wheel and a rotatable work holder adapted to support a piece of work having a cylindrical bore, dresser mechanism associated with the grinder comprising a primary slide and a secondary slide supported for movement toward the axial line of the bore and parallel thereto, a gaging element and a wheel dressing element supported by the secondary slide, hydraulic means operable to actuate said slides normal to the axial line of the bore and parallel thereto to advance the gaging element into the interior of the bore, said hydraulic means operable to actuate the secondary slide independently of the primary slide and at a slower rate of travel to move the gaging element into contact with the surface of said bore.

8. In an internal grinder having a rotatable grinding wheel and a rotatable work holder adapted to support a piece of work having a cylindrical bore, dresser mechanism associated therewith comprising a primary slide, a secondary slide supported upon the primary slide for movement as a unit therewith or independently thereof, a gaging element and a wheel dressing element carried by the secondary slide, hydraulic means coupled with said slides to move the primary slide and secondary slide as a unit a predetermined distance normal to and toward the axial line of the bore and upon completion of said movement to automatically move the secondary slide a predetermined distance normal to and toward the axial line of the bore independently of the primary slide, and upon the completion of said last movement to automatically move the primary slide and the secondary slide as a unit a predetermined distance parallel to the axial line of the bore, and upon the completion of said movement to automatically move the secondary slide relative to the primary slide to bring the gaging element into contact with the surface of the bore, and following the completion of said movement to automatically move both slides as a unit parallel to the axial line of the bore.

9. Dresser mechanism for an internal grinder having a rotatable grinding wheel and a work holder adapted to support a piece of work having a cylindrical bore comprising a slide provided with a gaging element and a wheel dressing element and hydraulic operating means coupled with the slide to actuate the slide to move the gaging element into the bore and into contact with the surface of the bore, said hydraulic operating means coupled with the dressing element and responsive to yielding engagement of the gaging element with the surface of the bore to advance the wheel dressing element into alignment with the gaging element on a line parallel to the axis of the bore.

10. Dresser mechanism for an internal grinder having a rotatable grinding wheel and a work holder adapted to support a piece of work having a cylindrical bore comprising, in combination, a primary slide supported for movement normal to and parallel to the axial line of the bore, a secondary slide supported upon the primary slide for movement therewith and for reciprocating movement normal to the axial line of the bore, a gage carried by the secondary slide, a dresser carried by the secondary slide, hydraulic mechanism operable to advance the primary slide and secondary slide as a unit a predetermined distance normal to and parallel to the axial line of the bore, hydraulic mechanism operable to withdraw the secondary slide relative to the primary slide a non-predetermined distance away from the axial line of the bore and until the gage carried by the secondary slide comes into contact with the surface of the bore, control mechanism responsive to engagement of the gage with the surface of the bore to terminate the hydraulic withdrawal of the secondary slide relative to the primary slide and to cause the hydraulic mechanism to advance the secondary slide parallel to the axis of the bore and away from the bore.

11. Dresser mechanism for an internal grinder having a rotatable grinding wheel and a work holder adapted to support a piece of work having a cylindrical bore comprising, in combination, a primary slide, a secondary slide supported upon the primary slide for movement therewith or relatively thereto, a dresser carried by the secondary slide, a gage carried by the secondary slide, hydraulic mechanism operable to advance or withdraw the primary slide and secondary slide as a unit a predetermined distance toward and away from the axial line of the bore, hydraulic mechanism operable to advance the primary slide and secondary slide as a unit a predetermined distance parallel to the axial line of the bore and toward and away from the bore, hydraulic mechanism operable to advance the secondary slide a predetermined distance toward the axial line of the bore and relative to the primary slide and to withdraw the secondary slide variable distances away from the axial line of the bore, a hydraulic circuit for supplying fluid pressure to said hydraulic mechanisms and control devices in said circuit controlling the delivery of fluid pressure to said hydraulic mechanisms.

12. Dressed mechanism for an internal grinder having a rotatable grinding wheel and a work holder adapted to support a piece of work having a cylindrical bore comprising, in combination, a primary slide, a secondary slide supported upon the primary slide for movement therewith or relatively thereto, a dresser carried by the secondary slide, a gage carried by the secondary slide, hydraulic mechanism operable to advance or withdraw the primary slide and secondary slide as a unit a predetermined distance toward and away from the axial line of the bore, hydraulic mechanism operable to advance the primary slide and secondary slide as a unit a predetermined distance parallel to the axial line of the bore and toward and away from the bore, hydraulic mechanism operable to advance the secondary slide a predetermined distance toward the axial line of the bore and relative to the primary slide and to withdraw the secondary slide variable distances away from the axial line of the bore, a hydraulic circuit for supplying fluid pressure to said hydraulic mechanisms, control mechanism automatically operable when the two slides have advanced as a unit a predetermined distance toward the axial line of the bore to direct fluid pressure to the hydraulic mechanism to advance the secondary slide relative to the primary slide a predetermined distance toward the axial line of the bore, control mechanism automatically operable when the secondary slide has advanced its predetermined distance toward the axial line of the bore to direct fluid pressure to the hydraulic mechanism to advance the two slides parallel to the axial line of the bore and toward the bore, control mechanism automatically operable when the two slides have advanced a predetermined distance toward the bore to direct fluid pressure to the hydraulic mechanism to withdraw the secondary slide away from the axial line of the bore, control mechanism automatically responsive to interruption of the withdrawal of the gage carried by the secondary slide away from the axial line of the bore to direct fluid pressure to the hydraulic mechanism to advance the two slides parallel to the axial line of the bore and away from the bore.

13. Dresser mechanism, comprising, in combination, a base, a primary slide supported upon the base for reciprocal movement in two relatively perpendicular directions, a secondary slide supported upon the primary slide for movement therewith and for relative reciprocating movement in a direction parallel to one direction of movement of the primary slide, a pair of relatively perpendicularly disposed pistons supported upon the base, said primary slide provided with relatively perpendicularly disposed cylinder bores wherein said pistons are slidably received, a piston supported upon the primary slide, said secondary slide provided with a cylinder bore wherein the piston of the primary slide is slidably received, a gage carried by the secondary slide, a wheel dresser carried by the secondary slide, and hydraulic circuit mechanism communicating with said piston and cylinder assemblies to deliver fluid pressure thereto.

14. Dresser mechanism, comprising, in combination, a base, a primary slide supported upon the base for reciprocal movement in two relatively perpendicular directions, a secondary slide supported upon the primary slide for movement therewith and for relative reciprocating movement in a direction parallel to one direction of movement of the primary slide, a pair of relatively perpendicularly disposed pistons supported upon the base, said primary slide provided with relatively perpendicularly disposed cylinder bores wherein said pistons are slidably received, a piston supported upon the primary slide, said secondary slide provided with a cylinder bore wherein the piston of the primary slide is slidably received, a gage carried by the secondary slide, a wheel dresser carried by the secondary slide, hydraulic mechanism carried by the secondary slide coupled with the wheel dresser operable to reciprocate the wheel dresser relative to the secondary slide and hydraulic circuit mechanism communicating with said piston and cylinder assemblies and said hydraulic mechanism to deliver fluid pressure thereto.

15. Dresser mechanism, comprising, in combination, a base, a primary slide supported upon the base for reciprocal movement in two relatively perpendicular directions, a secondary slide supported upon the primary slide for movement therewith and for relative reciprocating movement in a direction parallel to one direction of movement of the primary slide, a pair of relatively perpendicularly disposed pistons supported upon the base, said primary slide provided with relatively perpendicularly disposed cylinder bores wherein said pistons are slidably received, a piston supported upon the primary slide, said secondary slide provided with a cylinder bore wherein the piston of the primary slide is slidably received, a gage carried by the secondary slide, a wheel dresser carried by the secondary slide, hydraulic circuit mechanism communicating with said cylinder and piston assemblies to deliver liquid pressure thereto, and control mechanism responsive to the movement of said slides in a given direction to direct liquid pressure from one cylinder assembly into another cylinder assembly to vary the movement of said slides.

16. Dresser mechanism, comprising, in combination, a base, a primary slide supported upon the base for reciprocal movement in two relatively perpendicular directions, a secondary slide supported upon the primary slide for movement therewith and for relatively reciprocating movement in a direction parallel to one direction of movement of the primary slide, a pair of relatively perpendicularly disposed pistons supported upon the base, said primary slide provided with relatively perpendicularly disposed cylinder bores wherein said pistons are slidably received, a piston supported upon the primary slide, said secondary slide provided with a cylinder bore wherein the piston of the primary slide is slidable received, a gage carried by the secondary slide, a wheel dresser carried by the secondary slide, hydraulic circuit mechanism communicating with said cylinder and piston assemblies to deliver liquid pressure thereto, valves in said hydraulic circuit controlling the flow of liquid pressure into the several piston and cylinder assemblies and mechanism coupled with said slides responsive to movement thereof to actuate said valves.

17. Dresser mechanism for an internal grinder having a grinding wheel and a work holder adapted to support a piece of work provided with a cylindrical bore comprising, in combination, a gage, a wheel dresser, means operable to advance the gage along a line parallel to the axis of the bore and into the bore, means operable to advance the gage within the bore along a line normal to the axis of the bore and into contact with the surface thereof and means responsive to the engagement of the gage with the surface of the bore to advance the dresser into alignment with the gage on the line parallel to the axis of the bore.

18. Dresser mechanism for an internal grinder having a grinding wheel and a work holder adapted to support a piece of work provided with a cylindrical bore comprising, in combination, a gage, a wheel dresser, means operable to advance the gage and wheel dresser toward a line established by the surface of the bore and extending parallel to the axis of the grinding wheel and until the gage is brought into contact with the surface of the bore, means responsive to the engagement of the gage with the surface of the bore to discontinue said advance and to advance the wheel dresser independently of the gage and into alignment with the gage on a line parallel to the axis of the grinding wheel.

19. Dresser mechanism for an internal grinder having a grinding wheel and a work holder adapted to support a piece of work provided with a cylindrical bore comprising, in combination, a gage, a wheel dresser, means operable to advance the gage and wheel dresser along parallel paths and with the gage in advance of the wheel dresser until the gage comes into contact with the surface of the bore and means automatically operable when the gage is brought into contact with the surface of the bore to advance the wheel dresser independently of the gage into alignment with the gage upon a line extending parallel to the axis of the bore.

20. Dresser mechanism for an internal grinder having a grinding wheel and a work holder adapted to support a piece of work provided with a cylindrical bore comprising, in combination, a gage, a wheel dresser, means operable to advance the gage and wheel dresser along parallel paths and for equal distances and with the gage in advance of the wheel dresser until the gage is brought into contact with the surface of the bore and means automatically operable when the gage is brought into contact with the surface of the bore to advance the wheel dresser independently of the gage and into line with the gage on a line parallel to the axis of the bore.

21. Dresser mechanism for an internal grinder having a grinding wheel and a work holder adapted to support a piece of work provided with a cylindrical bore comprising, in combination, a gage, a wheel dresser, mechanism operable to advance the gage into the bore and into contact with the surface thereof, mechanism coupling the dresser with the gage to advance the dresser therewith and for the same distance toward a line parallel to the axis of the bore and passing through the surface thereof whenever the gage is advanced into the bore and toward the surface thereof, means operable to discontinue the advance of the dresser and the gage upon the gage being brought into contact with the surface of the bore and means automatically operable upon the gage coming into contact with the surface of the bore to advance the dresser independently of the gage to bring the dresser into alignment with the gage on a line parallel to the axis of the grinding wheel and established by the surface of the bore.

22. Dresser mechanism as defined in claim 3 characterized in that the gage is supported spaced a predetermined distance from the dresser upon said path during movement of the gage into contact with the surface of the bore.

23. Dresser mechanism as defined in claim 3 characterized in that the gage is supported spaced a predetermined distance from the dresser along said path during movement of the gage into contact with the surface of the bore and the gage and the dresser are coupled together to be advanced equal distances during said movement.

24. Dresser mechanism for an internal grinder provided with a grinding wheel and a work holder adapted to support a piece of work provided with a cylindrical bore comprising, in combination, a gage, a wheel dresser, slide mechanism supporting said gage and dresser, means supporting said slide mechanism whereby the slide mechanism may be moved to advance the gage and dresser along parallel paths toward a line established by the surface of the bore and extending parallel to the axis thereof until the gage is brought into contact with the surface of the bore, means coupled with the slide mechanism to move the same to advance the gage and dresser along said paths automatically responsive upon contact of the gage with the surface of the bore to discontinue said advance and to advance the dresser independently of the gage until the dresser is brought into alignment with the gage upon a line extending parallel to the axis of the bore.

25. Dresser mechanism for an internal grinder provided with a grinding wheel and a work holder adapted to support a piece of work provided with a cylindrical bore comprising, in combination, a gage, a wheel dresser, slide mechanism supporting said gage and dresser, means supporting said slide mechanism whereby the slide mechanism may be moved to advance the gage and dresser along parallel paths toward a line established by the surface of the bore and extending parallel to the axis thereof until the gage is brought into contact with the surface of the bore, means coupled with the slide mechanism to move the same to advance the gage and dresser along said paths to bring the gage into contact with the surface of the bore, said gage supported by the slide mechanism to yield with respect thereto upon pressure against the surface of the bore, means responsive to the yielding of the gage with respect to the slide to interrupt the movement of the slide mechanism and means responsive to the yielding of the gage with respect to the slide to advance the dresser independently of the gage to bring the dresser into alignment with the gage upon a line extending parallel to the axis of the bore.

MERVIL HALLEAD.

REFERENCES CITED

The following references are of record in the file of this patent:

UNITED STATES PATENTS

| Number | Name | Date |
|---|---|---|
| 1,731,719 | Kempton et al. | Oct. 15, 1929 |
| 1,751,202 | Heald et al. | Mar. 18, 1930 |
| 1,751,203 | Heald et al. | Mar. 18, 1930 |
| 1,779,094 | Heald et al. | Oct. 21, 1930 |
| 1,804,414 | Guild | May 12, 1931 |
| 1,826,070 | Guild | Oct. 6, 1931 |
| 1,882,814 | Haas | Oct. 18, 1932 |
| 1,964,433 | Guild et al. | June 26, 1934 |
| 1,994,386 | Dardani | Mar. 12, 1935 |